United States Patent
Hwang et al.

(10) Patent No.: US 12,414,135 B2
(45) Date of Patent: Sep. 9, 2025

(54) METHOD AND DEVICE FOR DETERMINING CBR VALUE IN NR V2X

(71) Applicant: LG Electronics Inc., Seoul (KR)

(72) Inventors: Daesung Hwang, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 404 days.

(21) Appl. No.: 18/019,043

(22) PCT Filed: Jul. 22, 2021

(86) PCT No.: PCT/KR2021/009502
§ 371 (c)(1),
(2) Date: Jan. 31, 2023

(87) PCT Pub. No.: WO2022/025524
PCT Pub. Date: Feb. 3, 2022

(65) Prior Publication Data
US 2023/0292344 A1    Sep. 14, 2023

(30) Foreign Application Priority Data

Jul. 31, 2020  (KR) .................. 10-2020-0095768
Dec. 22, 2020  (KR) .................. 10-2020-0181356

(51) Int. Cl.
*H04W 72/25* (2023.01)
*H04L 1/1812* (2023.01)

(52) U.S. Cl.
CPC ........... *H04W 72/25* (2023.01); *H04L 1/1812* (2013.01)

(58) Field of Classification Search
CPC ..... H04W 72/25; H04W 76/19; H04W 52/04; H04W 72/0428; H04W 52/36; H04W 72/121; H04L 1/1812; H04L 1/18
See application file for complete search history.

(56) References Cited

U.S. PATENT DOCUMENTS

| | | | | |
|---|---|---|---|---|
| 11,477,820 B2* | 10/2022 | Park | .................... | H04L 5/0094 |
| 12,225,397 B2* | 2/2025 | Shin | .................... | H04W 4/46 |
| 12,256,244 B2* | 3/2025 | Freda | .................... | H04W 24/04 |

FOREIGN PATENT DOCUMENTS

| | | | |
|---|---|---|---|
| JP | 2022531277 A | * | 10/2022 |
| KR | 2019-0039101 | | 4/2019 |

(Continued)

OTHER PUBLICATIONS

Ericsson, "[E046, E047] Correction to CBR measurements for V2X," R2-2003213, Presented at 3GPP TSG-RAN WG2 Meeting #109bis-e, Electronic Meeting, Apr. 20-Apr. 30, 2020, 817 pages.

*Primary Examiner* — Ricky Q Ngo
*Assistant Examiner* — Andrew Shaji Kurian
(74) *Attorney, Agent, or Firm* — Fish & Richardson P.C.

(57) ABSTRACT

A method for performing sidelink communication includes: performing first SL reception in a first time interval in which a timer relating to SL DRX operation operates; performing second SL reception in a third time interval included in a second time interval in which the timer does not operate; and performing SL transmission related to the first and/or second SL reception, wherein the first SL reception performed in the first time interval within a CBR window includes PSCCH reception and PSSCH reception, the second SL reception performed in the third time interval within the CBR window includes the PSCCH reception but not the PSSCH reception, and a first CBR value related to the second time interval is a ratio of sub-channels, which have an SL RSSI value no less than a first threshold value and include a PSCCH resource, from among all sub-channels to be attempted for PSCCH detection.

12 Claims, 18 Drawing Sheets

(56) References Cited

FOREIGN PATENT DOCUMENTS

| KR | 2020-0028020 | 3/2020 | |
|---|---|---|---|
| WO | WO 2020/060890 | 3/2020 | |
| WO | WO 2020/091346 | 5/2020 | |
| WO | WO-2021219212 A1 * | 11/2021 | ........ H04W 52/0216 |

* cited by examiner

METHOD AND DEVICE FOR DETERMINING CBR VALUE IN NR V2X

CROSS-REFERENCE TO RELATED APPLICATIONS

This application is a National Stage application under 35 U.S.C. § 371 of International Application No. PCT/KR2021/009502, filed on Jul. 22, 2021, which claims the benefit of Korean Patent Application No. 10-2020-0095768, filed on Jul. 31, 2020, and Korean Patent Application No. 10-2020-0181356, filed on Dec. 22, 2020. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

An object of the present disclosure is to provide a sidelink (SL) communication method between devices (or UEs) and a device (or UE) performing the same.

Another technical problem of the present disclosure is to provide a method for determining a CBR value in NR V2X and a device (or UE) performing the same.

According to an embodiment of the present disclosure, a method for performing, by a first device, sidelink communication may be proposed. The method may comprise: performing a first sidelink (SL) reception on a first time duration in which an on-duration timer for an SL discontinuous reception (DRX) operation is running; performing a second SL reception on a third time duration included in a second time duration in which the on-duration timer is not running; and performing an SL transmission related to at least one among the first SL reception or the second SL reception, wherein the first SL reception performed on the first time duration in a channel busy ratio (CBR) window may include a physical sidelink control channel (PSCCH) reception and a physical sidelink shared channel (PSSCH) reception, wherein the second SL reception performed on the third time duration in the CBR window may include the PSCCH reception and may not include the PSSCH reception, wherein a first CBR value related to the second time duration may be determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

According to an embodiment of the present disclosure, a first device for performing sidelink communication may be proposed. The first device may comprise: at least one memory storing instructions; at least one transceiver; and at least one processor connected to the at least one memory and the at least one transceiver, wherein the at least one processor may execute the instructions to: perform a first sidelink (SL) reception on a first time duration in which an on-duration timer for an SL discontinuous reception (DRX) operation is running; perform a second SL reception on a third time duration included in a second time duration in which the on-duration timer is not running; and perform an SL transmission related to at least one among the first SL reception or the second SL reception, wherein the first SL reception performed on the first time duration in a channel busy ratio (CBR) window may include a physical sidelink control channel (PSCCH) reception and a physical sidelink shared channel (PSSCH) reception, wherein the second SL reception performed on the third time duration in the CBR window may include the PSCCH reception and does not include the PSSCH reception, wherein a first CBR value related to the second time duration may be determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

A UE can efficiently perform SL communication.

DESCRIPTION OF EXEMPLARY EMBODIMENTS

Figure 1:
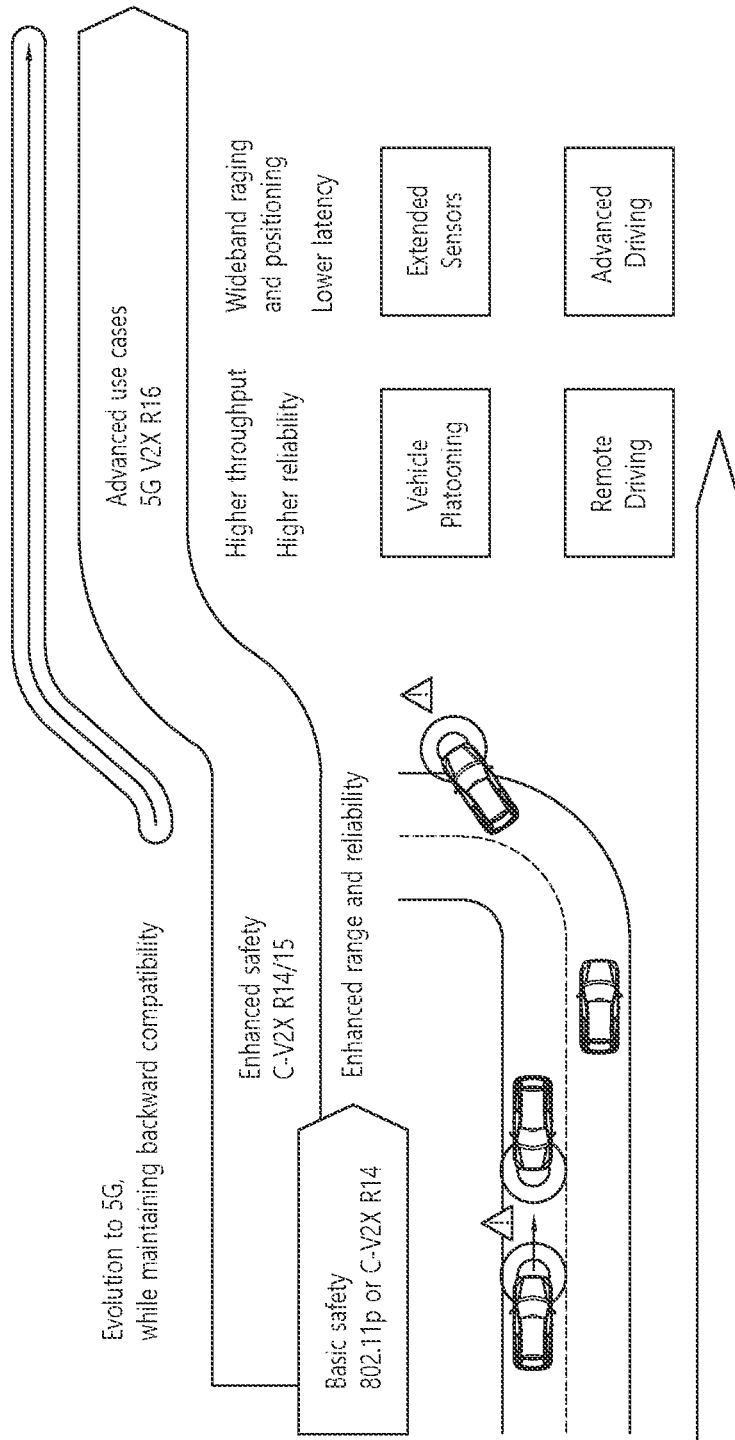
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
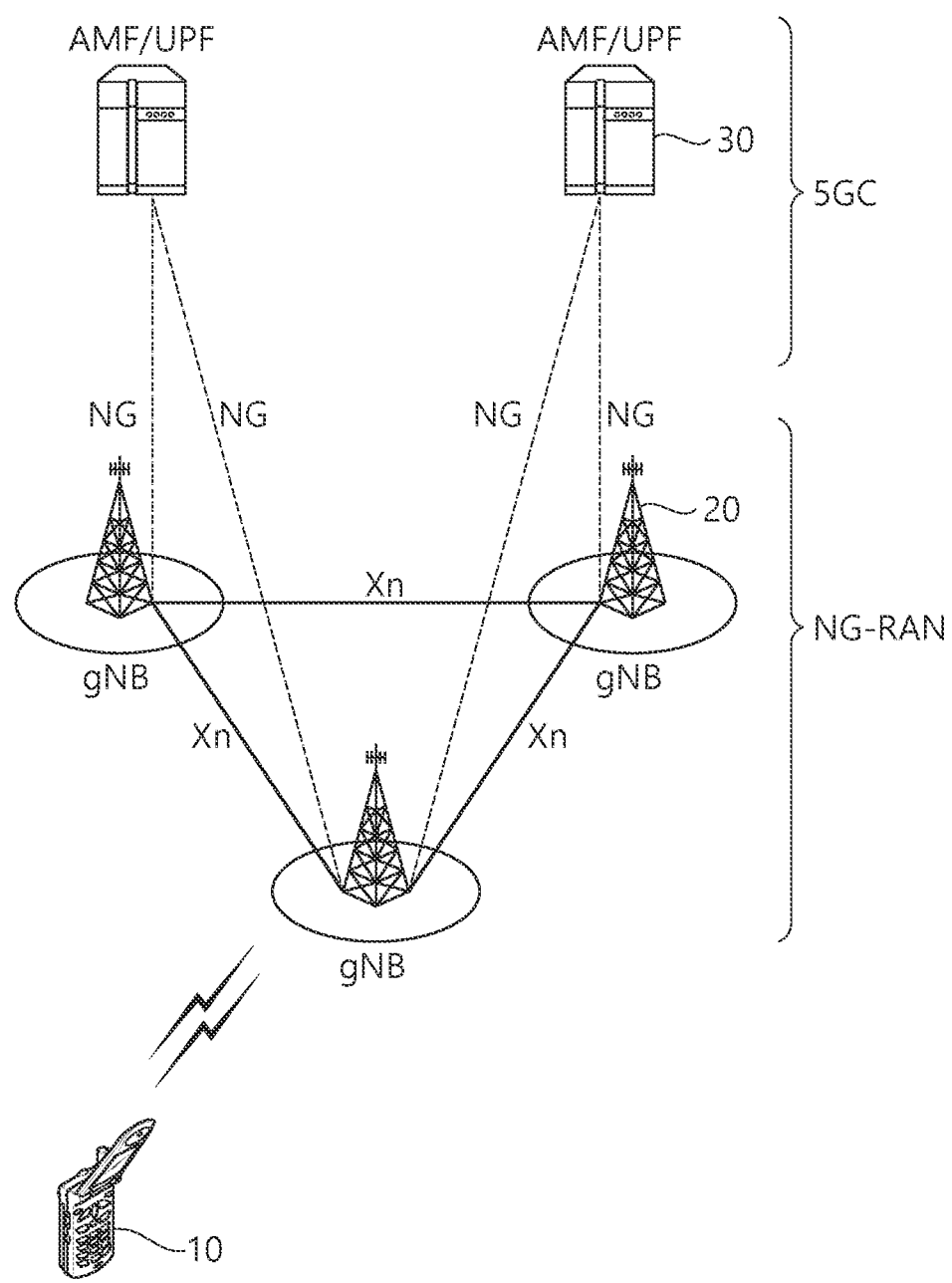
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
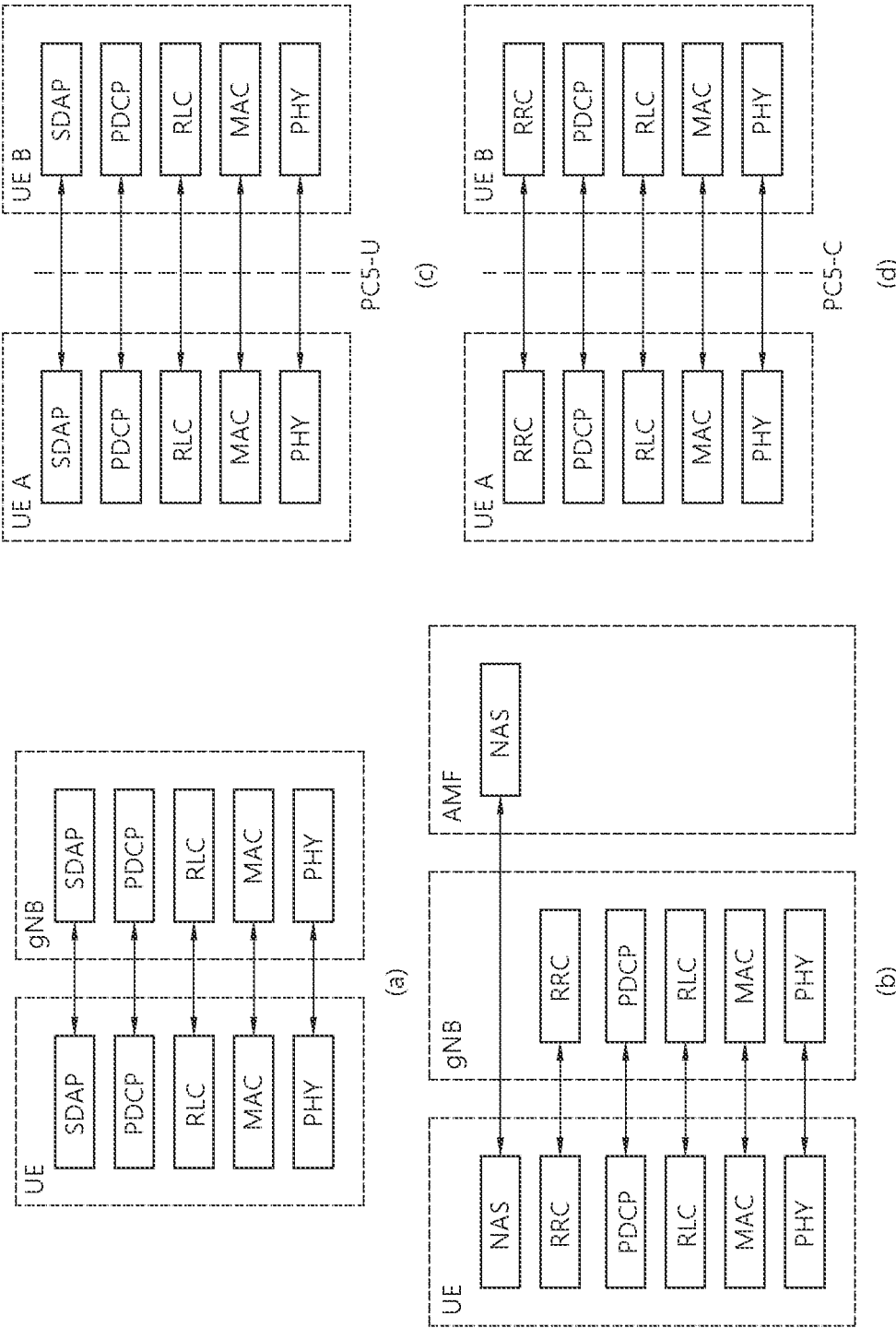
FIG. 3 shows a radio protocol architecture, in accordance with an embodiment of the present disclosure.

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a upper layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
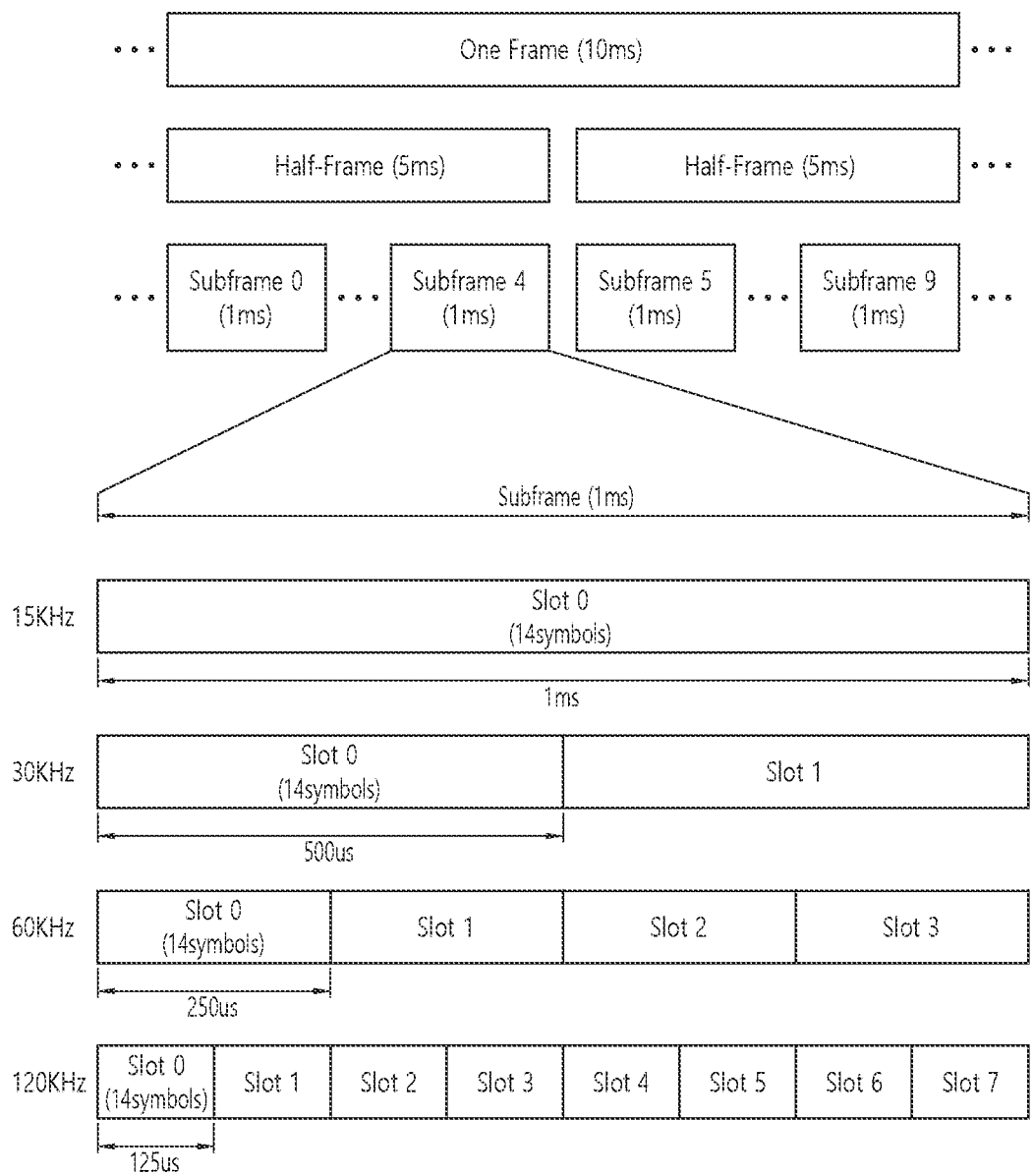
FIG. 4 shows a structure of a radio frame of an NR, in accordance with an embodiment of the present disclosure.

FIG. 4 shows a structure of a radio frame of an NR, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
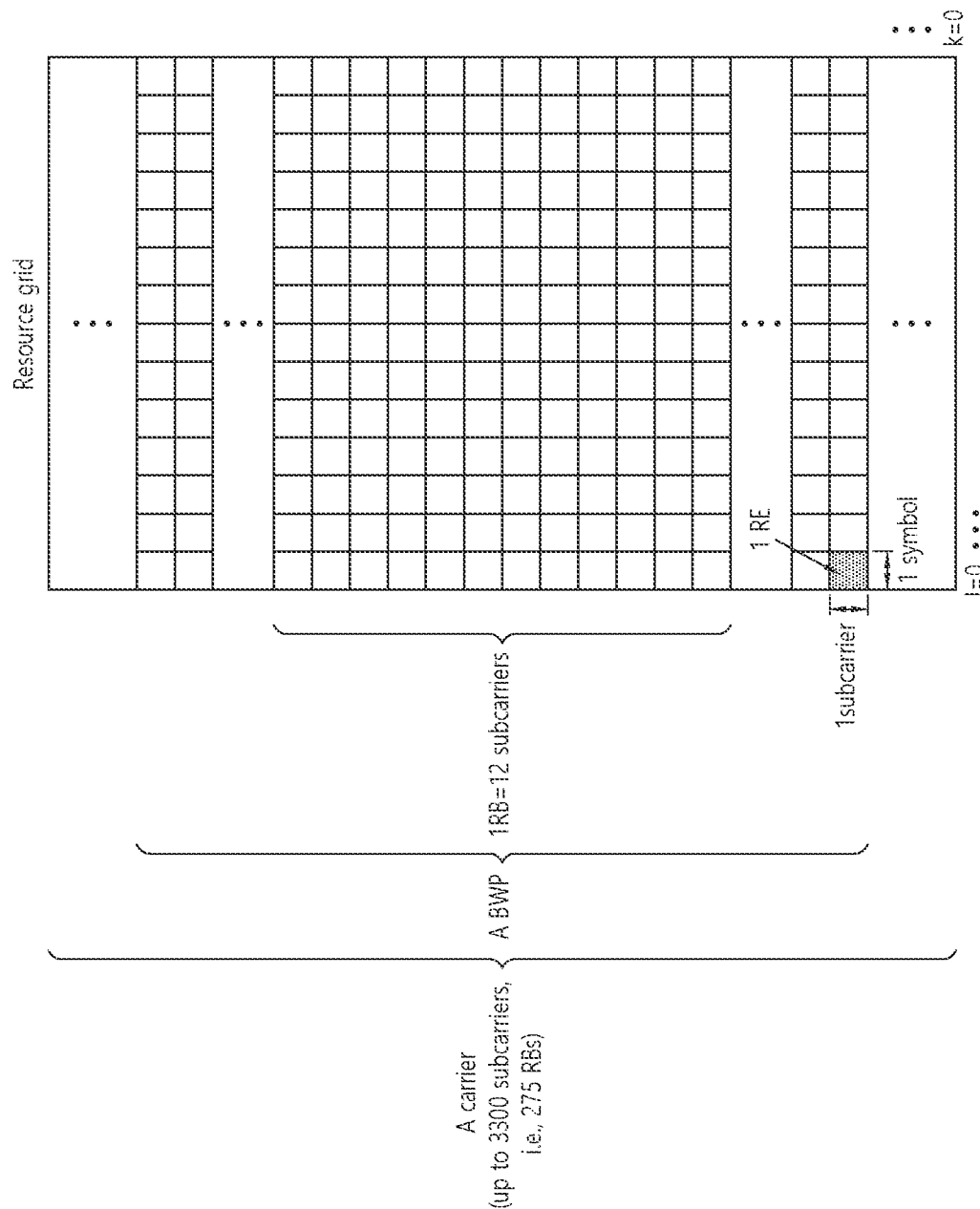
FIG. 5 shows a structure of a slot of an NR frame, in accordance with an embodiment of the present disclosure.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a upper layer. For example, an initial value of the default BWP may be an initial DL BWP. For energy saving, if the UE fails to detect downlink control information (DCI) during a specific period, the UE may switch the active BWP of the UE to the default BWP. Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC IDLE UE. For the UE in the RRC_CONNECTED mode, at least one SL BWP may be activated in the carrier.

Figure 6:
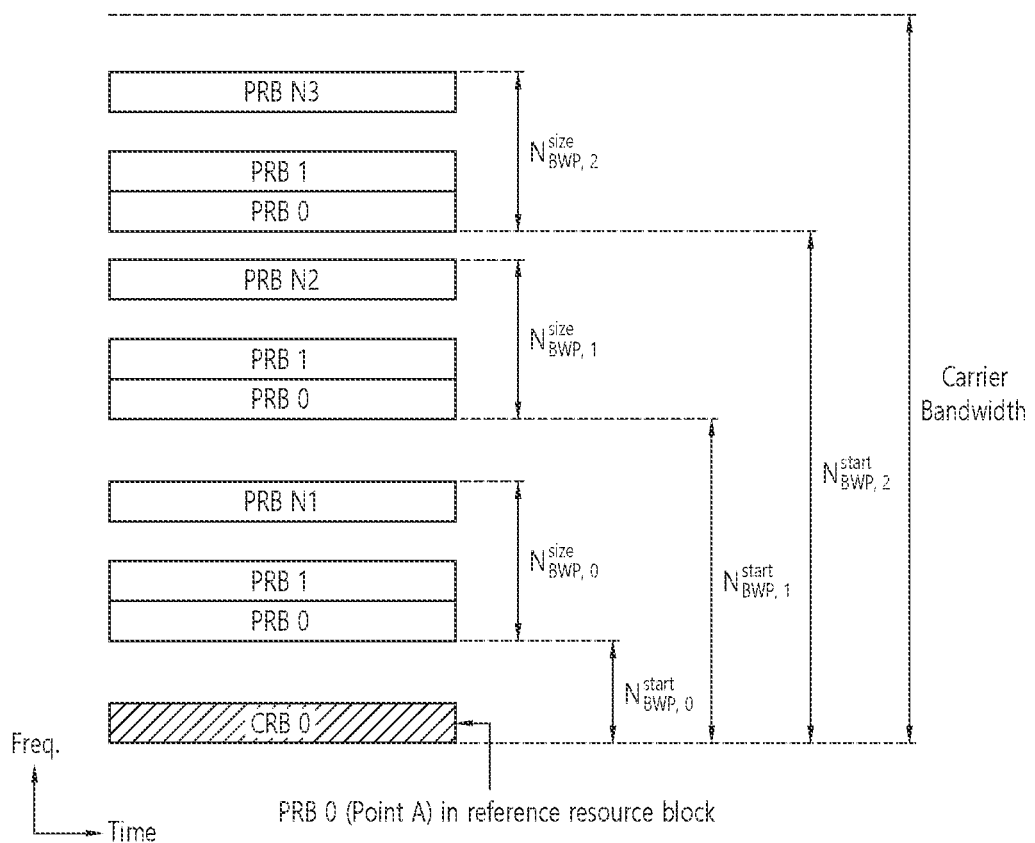
FIG. 6 shows an example of a BWP, in accordance with an embodiment of the present disclosure.

FIG. 6 shows an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
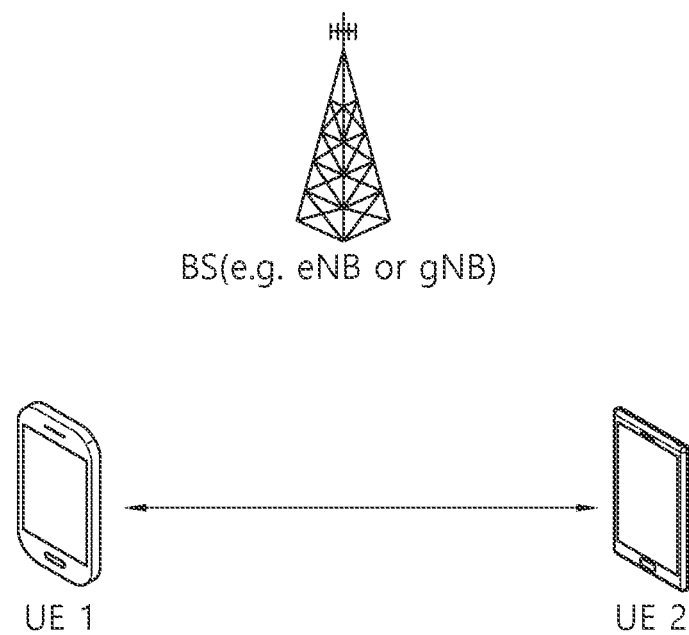
FIG. 7 shows a UE performing V2X or SL communication, in accordance with an embodiment of the present disclosure.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
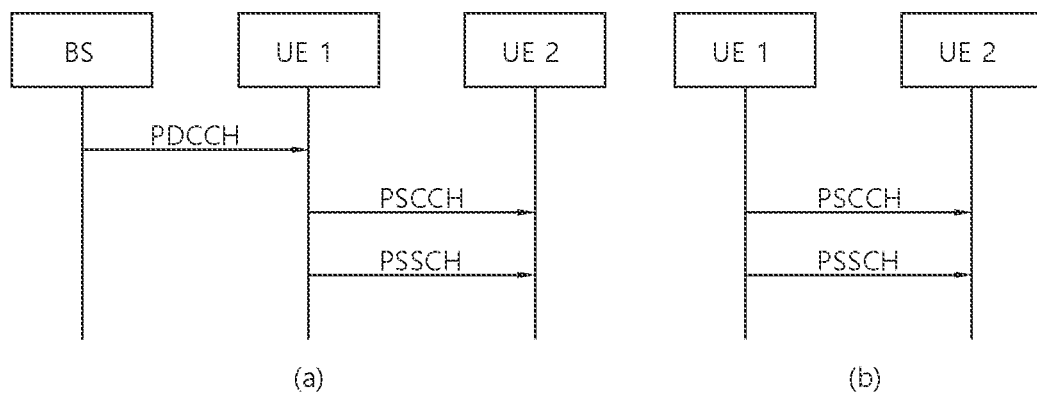
FIG. 8 shows a procedure of performing V2X or SL communication by a UE based on a transmission mode, in accordance with an embodiment of the present disclosure.

FIG. 8 shows a procedure of performing V2X or SL communication by a UE based on a transmission mode, in accordance with an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
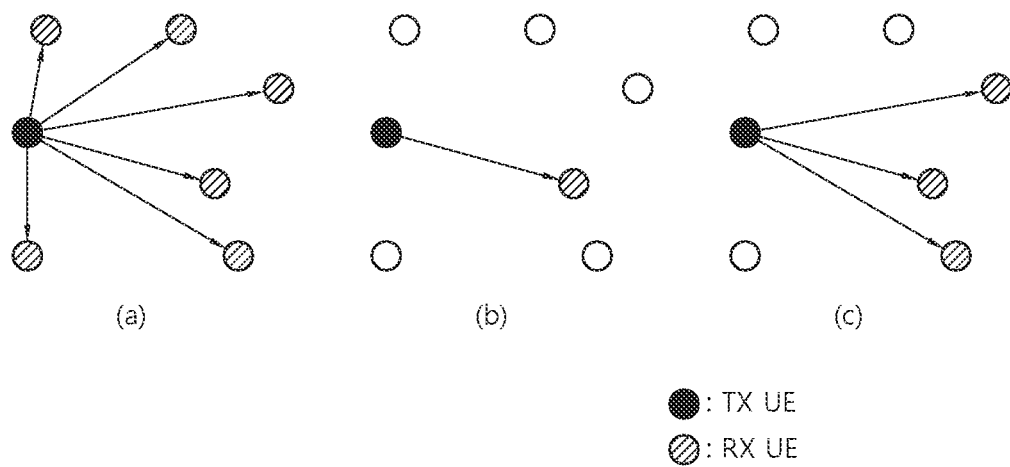
FIG. 9 shows three cast types, in accordance with an embodiment of the present disclosure.

FIG. 9 shows three cast types, in accordance with an embodiment of the present disclosure. The embodiment of FIG. 9 may be combined with various embodiments of the present disclosure. Specifically, FIG. 9(a) shows broadcast-type SL communication, FIG. 9(b) shows unicast type-SL communication, and FIG. 9(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 10:
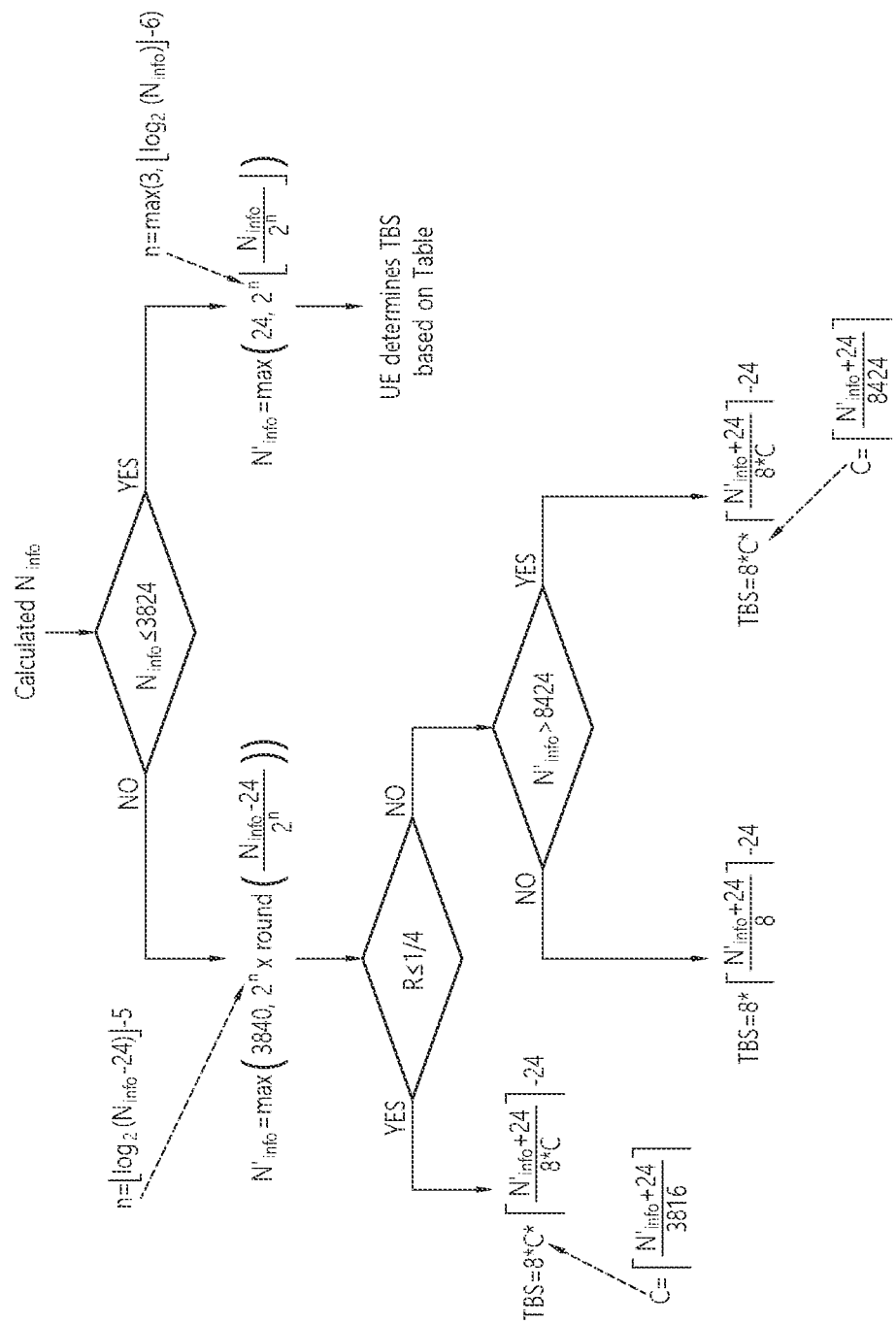
FIG. 10 shows a flowchart for TBS determination according to an embodiment of the present disclosure.

FIG. 10 shows a flowchart for TBS determination according to an embodiment of the present disclosure.

In this specification, the word "configure or define" may be interpreted as being (pre)configured (via predefined signaling (e.g., SIB, MAC signaling, RRC signaling)) from a base station or network. For example, "A can be configured" may include "(pre)setting/defining or notifying of A of a base station or network for the UE". Alternatively, the wording "configured or defined" may be interpreted as being pre-set or defined by the system. For example, "A may be set" may include "A is pre-set/defined by the system".

Meanwhile, in NR system, a UE may perform a TBS determination procedure for MAC PDU transmission. Unlike LTE system, since flexible TTI and time domain resource allocation are introduced in NR system, a UE can determine TBS based on a formula rather than a table. However, when the intermediate number of information bits is less than or equal to a specific value (e.g., 3824), a UE may determine TBS based on Table 5 below. Specifically, TBS determination procedure of a UE in NR system may refer to 3GPP TS 38.214 V16.1.0.

Hereinafter, in NR system, a procedure for determining TBS for communication with a base station by a UE will be briefly described.

First, in the first step, a UE may determine the number of REs ($N'_{RE}$) allocated for a PUSCH within one Physical Resource Block (PRB). Alternatively, a UE may determine the number of REs ($N'_{RE}$) allocated for a PDSCH within one PRB. RE may be obtained by Equation 1.

$$N'RE = N_{sc}^{RB} \cdot N_{DMRS}^{PRB} - N_{oh}^{PRB}$$ [Equation 1]

Here, $N^{RB}_{sc}$ may be the number of subcarriers in the frequency domain within a PRB. For example, $N^{RB}_{sc}$ may be 12. For example, in case of TBS decision for a PUSCH, $N^{sh}_{symb}$ may be the number of symbols of PUSCH allocation in a slot. For example, in case of TBS decision for a PDSCH, $N^{sh}_{symb}$ may be the number of symbols of PDSCH allocation in a slot. For example, $N^{PRB}_{DMRS}$ may be the number of Resource Elements (REs) for DM-RS per PRB during allocated duration or a scheduled duration including the overhead of a DM-RS CDM group. For example, $N^{PRB}_{oh}$ may be overhead set by upper layer parameters. If the upper layer parameter is not set, $N^{PRB}_{oh}$ may be assumed to be zero.

And, in the second step, a UE may determine the total number of REs ($N_{RE}$) allocated for a PUSCH. Alternatively, a UE may determine the total number of REs ($N_{RE}$) allocated for a PDSCH. $N_{RE}$ may be obtained by Equation 2.

$$N_{RE} = \min(156, N'_{RE}) \cdot n_{PRB}$$ [Equation 2]

Here, $n_{PRB}$ may be the total number of PRBs allocated for a UE. That is, a UE may obtain $N_{RE}$ by multiplying $n_{PRB}$ by a smaller number between $N'_{RE}$ and 156.

And, in the third step, a UE may obtain the intermediate number ($N_{info}$) of information bits. $N_{info}$ may be obtained by Equation 3.

$$N_{info} = N_{RE} \cdot R \cdot Q_m \cdot V$$ [Equation 3]

Here, R may be a code rate, and $Q_m$ may be a modulation order. v may be the number of layers.

And, in the fourth step, based on the calculated $N_{info}$, a UE may determine TBS according to the procedure shown in FIG. 10.

On the other hand, when $N_{info}$ is 3824 or less, a UE may determine TBS based on Table 5.

TABLE 5

| Index | TBS |
|-------|-----|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |

TABLE 5-continued

| Index | TBS |
|---|---|
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Hereinafter, in NR system, a method for determining TBS for SL communication by a UE and a device supporting the same will be described.

First, in the first step, a UE may determine the number of REs ($N'_{RE}$) allocated for a PSSCH within one Physical Resource Block (PRB). For example, N'RE may be obtained by any one of Equations 4 to 7.

$$N'_{RE} = N_{sc}^{RB} \cdot N_{symb}^{sh} - N_{oh}^{PRB} \quad \text{[Equation 4]}$$

$$N'_{RE} = N_{sc}^{RB} \cdot N_{symb}^{sh} - N_{DMRS}^{PRB} - N_{oh}^{PRB} \quad \text{[Equation 5]}$$

$$N'_{RE} = N_{sc}^{RB} \cdot (N_{symb}^{sh} - N_{symb}^{PSFCH}) - N_{oh}^{PRB} \quad \text{[Equation 6]}$$

$$N'_{RE} = N_{sc}^{RB} \cdot (N_{symb}^{sh} - N_{symb}^{PSFCH}) - N_{DMRS}^{PRB} - N_{oh}^{PRB} \quad \text{[Equation 7]}$$

Here, $N^{RB}_{sc}$ may be the number of subcarriers in the frequency domain within a PRB. For example, $N^{RB}_{sc}$ may be 12. For example, $N^{sh}_{symb}$ may be the number of symbols of PSSCH allocation within a slot. For example, $N^{PSFCB}_{symb}$ may be the number of symbols of PSFCH allocation within a slot. For example, $N^{PRB}_{DMRS}$ may be the number of Resource Elements (REs) for DM-RS for each PRB during an allocated duration or a scheduled duration including the overhead of a DM-RS CDM group. For example, $N^{PRB}_{oh}$ may be an overhead set by a upper layer parameter. If the upper layer parameter is not set, $N^{PRB}_{oh}$ may be assumed to be zero.

And, in the second step, a UE may determine the total number of REs ($N_{RE}$) allocated for a PSSCH. For example, $N_{RE}$ may be obtained by any one of Equations 8 to 12.

$$N_{RE} = \min(N_{max}, N'_{RE}) \cdot n_{PRB} \quad \text{[Equation 8]}$$

$$N_{RE} = \min(N_{max}, N'_{RE}) \cdot n_{PRB} - N_{PSCCH} \quad \text{[Equation 9]}$$

$$N_{RE} = \min(N_{max}, N'_{RE}) \cdot n_{PRB} - N_{PSCCH} - N_{oh}^{2ndSCI} \quad \text{[Equation 10]}$$

$$N_{RE} = \min(N_{max}, N'_{RE}) \cdot {}^*n_{PRB} - N_{PSCCH} - N_{oh}^{DMRS} \quad \text{[Equation 11]}$$

$$N_{RE} = \min(N_{max}, N'_{RE}) \cdot n_{PRB} - N_{PSCCH} - N_{oh}^{DMRS} - N_{oh}^{2ndSCI} \quad \text{[Equation 12]}$$

Here, $n_{PRB}$ may be the total number of PRBs allocated for a UE. For example, Nmax may be an upper limit value. For example, Nmax may be 156. For example, $N_{PSCCH}$ may be the exact number of REs for a PSCCH. For example, $N_{PSCCH}$ may be the number of REs for a PSCCH within the total PRB allocated for a UE. For example, the number of REs for a PSCCH may include the number of REs to which a DMRS transmitted through a PSCCH (i.e., PSCCH DMRS) are mapped. For example, an RE for a PSCCH may include an RE to which control information transmitted through a PSCCH is mapped and an RE to which a DMRS (i.e., PSCCH DMRS) transmitted through a PSCCH is mapped. That is, a UE may determine the number of reference REs by subtracting the number of REs related to a PSCCH from a value obtained by multiplying $n_{PRB}$ by the smaller number of $N'_{RE}$ and Nmax. For example, $N^{2ndSCI}_{oh}$ may be overhead related to 2nd SCI. For example, $N^{DMRS}_{oh}$ may be overhead related to a DMRS.

And, in the third step, a UE may obtain the intermediate number ($N_{info}$) of the information bits. $N_{info}$ may be obtained by Equation 13.

$$N_{info} = N_{RE} \cdot R \cdot Q_m \cdot v \quad \text{[Equation 13]}$$

Here, R may be a code rate, and Qm may be a modulation order. v may be the number of layers.

And, in the fourth step, based on the calculated $N_{info}$, a UE may determine TBS according to the procedure shown in FIG. 10. Meanwhile, when $N_{info}$ is 3824 or less, a UE may determine TBS based on Table 5.

Meanwhile, in NR system, a UE may calculate a peak data rate for DL and/or UL. For example, based on the maximum data rate for the DL, a UE is not requested to process single or multiple PDSCH transmissions exceeding the maximum data rate for the DL. For example, based on the maximum data rate for the UL, a UE is not requested to process single or multiple PUSCH transmissions exceeding the maximum data rate for the UL. The above operation has an advantage of reducing the complexity of a UE in a non-slot-based scheduling situation (e.g., a situation in which a plurality of PDSCHs or PUSCHs can be scheduled in a slot), especially rather than slot-based scheduling. The above operation has an advantage of reducing the complexity of a UE in a non-slot-based scheduling situation (e.g., a situation in which a plurality of PDSCHs or PUSCHs can be scheduled in a slot), especially rather than slot-based scheduling.

Meanwhile, in NR SL, a UE can transmit and/or receive an SL channel through slot-based scheduling. Also, similar to DL and/or UL, UE operation based on a maximum data rate may be defined. For example, in order to calculate the maximum data rate, a UE needs to determine/define the number of REs for transmitting and receiving a PSSCH. Furthermore, a UE needs to determine/define the number of symbols for a PSSCH DMRS, the number of REs for a PSCCH, the number of REs for second SCI, modulation coding scheme (MCS), modulation order, coding rate, the number of layers, existence of RS other than a DMRS, and the number of REs for RS other than a DMRS, and/or whether or not a PSFCH exists. For example, a UE is not required to transmit and/or receive processing for single or multiple PSSCH transmissions having a data rate equal to or greater than the maximum data rate. For example, the data rate for the PSSCH may be limited to that for an SL-SCH. For example, the data rate for the PSSCH may be the sum of the data rate for an SL-SCH and the data rate for second SCI. For example, the data rate for the PSSCH may be a value dividing the sum of the payload amount of TBS for an SL-SCH and 2nd SCI by the number of REs for mapping 2nd SCI and/or an SL-SCH on a PSSCH. In the above, the payload amount of TBS and/or second SCI may include CRC. For example, a UE is not requested to process transmission and/or reception of a PSSCH having a data rate equal to or greater than the maximum data rate for second SCI. For example, the maximum data rate for the second SCI may be predefined. For example, the maximum data rate for the second SCI may be the same as the maximum data rate for a PSSCH. For example, it can be expected that a UE does not transmit a PSSCH having a data rate equal to or higher than the maximum data rate. That is, a UE may not transmit a PSSCH having a data rate equal to or higher than the maximum data rate. For example, a UE may calculate data rates for the scheduling for transmission and reception, respectively. For example, a UE may calculate the data rate for the scheduling by summing the data rate for transmission and reception.

For example, a UE may calculate/determine a maximum data rate for SL transmission and a maximum data rate for SL reception differently. For example, a UE may calculate/determine a maximum data rate for SL transmission based on a single PSSCH. For example, a UE may calculate/determine the maximum data rate for SL reception based on single or multiple PSSCH transmissions. For example, a UE may calculate/determine the maximum data rate for SL reception by multiplying the maximum data rate for a single PSSCH by a scaling value (e.g., a scaling factor). For example, the scaling value may be set, preset, or predefined for each UE. For example, the scaling value may be set, preset, or predefined for each congestion level. the scaling value may be set, preset, or predefined for each resource pool. For example, the scaling value may be set, preset, or predefined for each SL BWP. For example, the scaling value may be set, preset, or predefined for each SL carrier. For example, the scaling value may be the number of reception resource pools in an SL carrier. For example, the scaling value may be the maximum number of FDM reception resource pools within an SL carrier. For example, a UE may calculate/determine the maximum data rate for SL transmission and the maximum data rate for SL reception as the same.

For example, an MCS value (e.g., modulation order and/or coding rate) and/or the number of layers used by a UE to calculate/determine the SL maximum data rate may be a value configured according to UE capability. For example, an MCS value (e.g., modulation order and/or coding rate) and/or the number of layers used by a UE to calculate/determine the SL maximum data rate may be the maximum value for each of the values (pre-)configured for a plurality of resource pools in an SL carrier. Specifically, for example, it is assumed that a plurality of resource pools are set for a UE in an SL carrier, and the MCS value (pre-)configured for a first resource pool is the largest among MCS values (pre-)set for each of the plurality of resource pools, and the number of layers (pre-)configured for a second resource pool is the largest among the numbers of layers (pre-)configured for each of the plurality of resource pools. In this case, a UE may calculate/determine the maximum SL data rate using an MCS value of a first resource pool and the number of layers of a second resource pool. For example, an MCS value (e.g., modulation order and/or coding rate) and/or the number of layers used by a UE to calculate/determine the SL maximum data rate may be combination of values for which spectral efficiency is maximized among values (pre-)configured for a plurality of resource pools in an SL carrier. That is, for example, a UE may obtain a first value by multiplying i) a modulation order value, ii) a coding rate value, and iii) a value of the number of layers for each resource pool. And, a UE may calculate/determine the maximum SL data rate using an MCS value and/or the number of layers of a resource pool in which the first value is the maximum among one or more resource pools. In this specification, the SL maximum data rate may include at least one of a maximum data rate for SL transmission and/or a maximum data rate for SL reception.

For example, the number of REs for a PSCCH used by a UE to calculate/determine the SL maximum data rate may be the minimum value among the number of REs derived from the number of configurable symbols and the number of configurable RBs. For example, the number of REs for a PSCCH used by a UE to calculate/determine the SL maximum data rate may be the maximum value among the number of REs derived from the number of configurable symbols and the number of configurable RBs. For example, the number of REs for a PSCCH used by a UE to calculate/determine the SL maximum data rate may be the average value of the number of REs derived from the number of configurable symbols and the number of configurable RBs. For example, if the average value is not an integer, a UE may convert the average value into an integer by applying rounding down. For example, if the average value is not an integer, a UE may convert the average value into an integer by applying rounding up. For example, if the average value is not an integer, a UE may convert the average value into an integer by applying rounding off. Specifically, for example, the number of symbols may be 2 (e.g., 2 OFDM symbols), and the number of RBs may be 10 (e.g., 10 PRBs). For example, the number of REs for a PSCCH used by a UE to calculate/determine the SL maximum data rate may be a value with the minimum overhead among values (pre-)configured for a plurality of resource pools in an SL carrier. For example, the number of REs for a PSCCH used by a UE to calculate/determine the SL maximum data rate may be a value with the largest overhead among the values (pre-)configured for a plurality of resource pools in an SL carrier. For example, the number of REs for a PSCCH used by a UE to calculate/determine the SL maximum data rate may be an average value of the number of REs derived from the number of configurable symbols and the number of configurable RBs. For example, the number of REs for a PSCCH used by a UE to calculate/determine the SL maximum data rate may be an average value of the number of REs derived from values (pre-)configured for a plurality of resource pools in an SL carrier.

For example, the number of REs for an SL CSI-RS used by a UE to calculate/determine the SL maximum data rate may be 0. For example, the number of REs for a PT-RS used by a UE to calculate/determine the maximum SL data rate may be 0.

For example, the number of REs for an SL CSI-RS used by a UE to calculate/determine the SL maximum data rate may be the minimum value among possible values of an overhead value used in TBS calculation. For example, the number of REs for an SL CSI-RS used by a UE to calculate/determine the SL maximum data rate may be the average value of the possible values of overhead value used in TBS calculation. For example, the number of REs for an SL CSI-RS used by a UE to calculate/determine the SL maximum data rate may be the maximum value among possible values of an overhead value used in TBS calculation. For example, the number of REs for a PT-RS that a UE uses to calculate/determine the SL maximum data rate may be the minimum value among possible values of an overhead value used in TBS calculation. For example, the number of REs for a PT-RS that a UE uses to calculate/determine the SL maximum data rate may be the average value of the possible values of overhead value used in TBS calculation. For example, the number of REs for a PT-RS that a UE uses to calculate/determine the SL maximum data rate may be the maximum value among possible values of an overhead value used in TBS calculation. For example, the number of REs for a PT-RS and an SL CSI-RS used by a UE to calculate/determine the SL maximum data rate may be the minimum value among possible values of an overhead value used in TBS calculation. For example, the number of REs for a PT-RS and an SL CSI-RS used by a UE to calculate/determine the SL maximum data rate may be the average value of the possible values of overhead value used in TBS calculation. For example, the number of REs for a PT-RS and an SL CSI-RS used by a UE to calculate/determine the SL maximum data rate may be the maximum value among possible values of an overhead value used in TBS calculation. For example, a base station may transmit an overhead value used in calculating TBS to a UE. For example, an overhead value used in calculating TBS may be sl-x-Overhead value.

For example, the number of REs for an SL CSI-RS used by a UE to calculate/determine the SL maximum data rate may be the minimum value among the overhead values (pre-)configured for a plurality of resource pools within an SL carrier. For example, the number of REs for an SL CSI-RS used by a UE to calculate/determine the SL maximum data rate may be the average value of the overhead values (pre-)configured for multiple resource pools within an SL carrier. For example, the number of REs for an SL CSI-RS used by a UE to calculate/determine the SL maximum data rate may be the maximum value among the overhead values (pre-)configured for a plurality of resource pools within an SL carrier. For example, the number of REs for a PT-RS that a UE uses to calculate/determine the SL maximum data rate may be the minimum value among the overhead values (pre-)configured for a plurality of resource pools within an SL carrier. For example, the number of REs for a PT-RS that a UE uses to calculate/determine the SL maximum data rate may be the average value of the overhead values (pre-)configured for multiple resource pools within an SL carrier. For example, the number of REs for a PT-RS that a UE uses to calculate/determine the SL maximum data rate may be the maximum value among the overhead values (pre-)configured for a plurality of resource pools within an SL carrier. For example, the number of REs for a PT-RS and an SL CSI-RS used by a UE to calculate/determine the SL maximum data rate may be the minimum value among the overhead values (pre-)configured for a plurality of resource pools within an SL carrier. For example, the number of REs for a PT-RS and an SL CSI-RS used by a UE to calculate/determine the SL maximum data rate may be the average value of the overhead values (pre-)configured for multiple resource pools within an SL carrier. For example, the number of REs for a PT-RS and an SL CSI-RS used by a UE to calculate/determine the SL maximum data rate may be the maximum value among the overhead values (pre-)configured for a plurality of resource pools within an SL carrier. For example, the overhead value may be sl-x-Overhead value.

For example, the overhead value may be differently defined, configured, or pre-configured for a UE for each frequency range (FR). For example, the minimum value for the overhead value may be differently defined, configured, or pre-configured for a UE for each frequency range (FR). For example, the maximum value for the overhead value may be differently defined, configured, or pre-configured for a UE for each frequency range (FR). For example, the average value for the overhead value may be differently defined, configured, or pre-configured for a UE for each frequency range (FR).

For example, the number of symbols for a PSSCH DMRS used by a UE to calculate/determine the SL maximum data rate may be the minimum value among configurable values. For example, the number of symbols for a PSSCH DMRS used by a UE to calculate/determine the SL maximum data rate may be the maximum value among configurable values. For example, the number of symbols for a PSSCH DMRS used by a UE to calculate/determine the SL maximum data rate may be the average value of configurable values or an integer value through rounding up or rounding down or rounding off for the average value. For example, the number of symbols for a PSSCH DMRS used by a UE to calculate/ determine the SL maximum data rate may be the minimum value among the candidate values of the number of symbols for a PSSCH DMRS (pre-)configured for a plurality of resource pools in an SL carrier. For example, the number of symbols for a PSSCH DMRS used by a UE to calculate/determine the SL maximum data rate may be the average value of the candidate values of the number of symbols for a PSSCH DMRS (pre-)configured for a plurality of resource pools in an SL carrier. For example, the number of symbols for a PSSCH DMRS used by a UE to calculate/determine the SL maximum data rate may be the maximum value among the candidate values of the number of symbols for a PSSCH DMRS (pre-)configured for a plurality of resource pools in an SL carrier. For example, when a UE determines the number of REs for a PSSCH DMRS used to calculate/determine the SL maximum data rate, a UE may determine the number of REs for a PSSCH DMRS by excluding the number of REs for which transmission is omitted due to overlap with a PSCCH. For example, when a UE determines the number of REs for a PSSCH DMRS used to calculate/determine the SL maximum data rate, a UE may determine the number of REs for a PSSCH DMRS by including the number of REs for which transmission is omitted due to overlap with a PSCCH. For example, when a UE determines the number of REs for a PSSCH DMRS used to calculate/determine the SL maximum data rate, a UE may determine the number of REs for a PSSCH DMRS by excluding the number of REs whose transmission is omitted according to an overlap with a PSFCH symbol. For example, when a UE determines the number of REs for a PSSCH DMRS used to calculate/determine the SL maximum data rate, a UE may determine the number of REs for a PSSCH DMRS by including the number of REs whose transmission is omitted according to an overlap with a PSFCH symbol. In this specification, a PSSCH DMRS may be a DMRS transmitted/received on a PSSCH, a PSCCH DMRS may be a DMRS transmitted/received on a PSCCH. For example, a PSSCH DMRS may be used for decoding of a PSSCH, a PSCCH DMRS may be used for decoding of a PSCCH.

For example, the length of a PSSCH symbol duration used by a UE to calculate/determine the SL maximum data rate may be 12 symbols. For example, the length of a PSSCH symbol duration used by a UE to calculate/determine the SL maximum data rate may be 12 symbols, excluding a symbol of AGC and a symbol for TX-RX switching. For example, the length of a PSSCH symbol duration used by a UE to calculate/determine the SL maximum data rate may be determined based on an SL symbol duration configured in an SL BWP (e.g., sl-LengthSymbols). For example, the length of the PSSCH symbol duration may be sl-LengthSymbols−2. For example, the length of the PSSCH symbol duration may be sl-LengthSymbols−2, excluding a symbol of AGC and a symbol for TX-RX switching. For example, the length of the PSSCH symbol duration may be different according to a PSFCH resource period value. For example, the length of a PSSCH symbol duration used by a UE to calculate/determine the SL maximum data rate may be the minimum value among the lengths of PSSCH symbol durations derived according to a PSFCH resource period values (pre-)configured for a plurality of resource pools in an SL carrier. For example, the length of a PSSCH symbol duration used by a UE to calculate/determine the SL maximum data rate may be the average value of the lengths of PSSCH symbol durations derived according to a PSFCH resource period values (pre-)configured for a plurality of resource pools in an SL carrier. For example, the length of a PSSCH symbol duration used by a UE to calculate/determine the SL maximum data rate may be the maximum value among the lengths of PSSCH symbol durations derived according to a PSFCH resource period values (pre-)configured for a plurality of resource pools in an SL carrier. For example, the length of a PSSCH symbol duration derived according to the PSSCH resource period value may be the minimum value of the length of a PSSCH symbol duration for each resource pool. For example, the length of a PSSCH symbol duration derived according to the PSSCH resource period value may be the average value of the length of a PSSCH symbol duration for each resource pool. For example, the length of a PSSCH symbol duration derived according to the PSSCH resource period value may be the maximum value of the length of a PSSCH symbol duration for each resource pool.

For example, the number of REs for second SCI used by a UE to calculate/determine the SL maximum data rate may be 0. For example, the number of REs for second SCI used by a UE to calculate/determine the SL maximum data rate may be determined based on a specific beta offset value. For example, the number of REs for second SCI used by a UE to calculate/determine the SL maximum data rate may be determined based on payload amount of second SCI. For example, the number of REs for second SCI used by a UE to calculate/determine the SL maximum data rate may be determined based on a specific coding rate value. For example, the number of REs for second SCI used by a UE to calculate/determine the SL maximum data rate may be determined based on a specific gamma offset value. For example, the number of REs for second SCI used by a UE to calculate/determine the SL maximum data rate may be determined based on a specific alpha offset value. For example, the number of REs for second SCI used by a UE to calculate/determine the SL maximum data rate may be determined based on a specific DMRS pattern. For example, the number of REs for second SCI used by a UE to calculate/determine the SL maximum data rate may be determined based on a specific PT-RS pattern. For example, the number of REs for second SCI used by a UE to calculate/determine the SL maximum data rate may be determined based on a specific CSI-RS pattern. For example, a UE may calculate/determine the maximum SL data rate by using a value that minimizes the number of REs for second SCI among combinations of each of possible values for the parameters (e.g., a specific beta offset value, and/or second SCI payload amount, and/or a specific coding rate value, and/or a specific gamma offset value, and/or a specific DMRS pattern, and/or a specific PT-RS pattern, and/or or a specific CSI-RS pattern).

For example, the beta offset value may be the minimum value among the configured values in the SL carrier. For example, the beta offset value may be the maximum value among the configured values in the SL carrier. For example, the beta offset value may be the average value of the configured values in the SL carrier. For example, a UE may determine the second SCI payload amount, based on the size of a specific second SCI format (e.g., a format in which Zone ID field and Communication range requirement field do not exist, that is, SCI format 2-A). For example, Exceptionally, when SCI format 2-A is not used in the SL carrier, a UE may determine the amount of the second SCI payload based on the size of SCI format 2-B. Table 6 shows an example of SCI format 2-A and SCI format 2-B.

TABLE 6A 8.4 Sidelink control information on PSSCH
SCI carried on PSSCH is a $2^{nd}$-stage SCI, which transports sidelink scheduling information.
8.4.1 2nd-stage SCI formats
The fields defined in each of the $2^{nd}$-stage SCI formats below are mapped to the information bits $a_0$ to $a_{A-1}$ as follows:
Each field is mapped in the order in which it appears in the description, with the first field mapped to the lowest order information bit a, and each successive field mapped to higher order information bits. The most significant bit of each field is mapped to the lowest order information bit for that field, e.g. the most significant bit of the first field is mapped to d0-
8.4.1.1 SCI format 2-A
SCI format 2-A is used for the decoding of PSSCH, with HARQ operation when HARQ-ACK information includes ACK or NACK, or when there is no feedback of HARQ-ACK information.
The following information is transmitted by means of the SCI format 2-A:
   HARQ process number - $\lceil \log_2 N_{process} \rceil$ bits as defined in clause 16.4 of [5, TS 38.213].
   New data indicator - 1 bit as defined in clause 16.4 of [5, TS 38.213].
   Redundancy version - 2 bits as defined in clause 16.4 of [6, TS 38.214].
   Source ID - 8 bits as defined in clause 8.1 of [6, TS 38.214].
   Destination ID - 16 bits as defined in clause 8.1 of [6, TS 38.214].
   HARQ feedback enabled/disabled indicator - 1 bit as defined in clause 16.3 of [5, TS 38.213].
   Cast type indicator - 2 bits as defined in Table 8.4.1.1-1.
   CSI request - 1 bit as defined in clause 8.2.1 of [6, TS 38.214].
8.4.1.2 SCI format 2-B
SCI format 2-B is used for the decoding of PSSCH, with HARQ operation when HARQ-ACK information includes only NACK, or when there is no feedback of HARQ-ACK information.
The following information is transmitted by means of the SCI format 2-B:
   HARQ process number - $\lceil \log_2 N_{process} \rceil$ bits as defined in clause 16.4 of [5, TS 38.213].
   New data indicator - 1 bit as defined in clause 16.4 of [5, TS 38.213].
   Redundancy version - 2 bits as defined in clause 16.4 of [6, TS 38.214].
   Source ID - 8 bits as defined in clause 8.1 of [6, TS 38.214].
   Destination ID - 16 bits as defined in clause 8.1 of [6, TS 38.214].
   HARQ feedback enabled/disabled indicator - 1 bit as defined in clause 16.3 of [5, TS 38.213].
   Zone ID - 12 bits as defined in clause 5.8.1.1 of [9, TS 38.331].
   Communication range requirement - 4 bits as defined in [9, TS 38.331]

TABLE 6B

| Value of Cast type indicator | Cast type |
| --- | --- |
| 00 | Broadcast |
| 01 | Groupcast |
| 10 | Unicast |
| 11 | Reserved |

For example, the coding rate value may be the minimum value among the values configurable for multiple MCS tables or MCS tables supported by a UE (through UE capability). For example, the coding rate value may be the maximum value among the values configurable for multiple MCS tables or MCS tables supported by a UE (through UE capability). For example, the coding rate value may be the average value of the values configurable for multiple MCS tables or MCS tables supported by a UE (through UE capability). For example, the coding rate value may be the maximum value among the MCS entries indicating the maximum modulation order supported by a UE. For example, the coding rate value may be the minimum value for a plurality of MCS tables indicating a value equal to or smaller than the maximum modulation order supportable by a UE or among the MCS entries of an MCS table supported by a UE (through UE capability) or a default MCS table. For example, the coding rate value may be the average value for a plurality of MCS tables indicating a value equal to or smaller than the maximum modulation order supportable by a UE or of the MCS entries of an MCS table supported by a UE (through UE capability) or a default MCS table.

For example, the alpha offset value used when calculating the upper limit for the number of REs to which second SCI is mapped may be the minimum value among configurable values. For example, the alpha offset value used when calculating the upper limit for the number of REs to which second SCI is mapped may be the maximum value among configurable values. For example, the alpha offset value used when calculating the upper limit for the number of REs to which second SCI is mapped may be the average value of configurable values. For example, the alpha offset value used when calculating the upper limit for the number of REs to which second SCI is mapped may be the minimum value among values configured for single or multiple resource pools in the SL carrier. For example, the alpha offset value used when calculating the upper limit for the number of REs to which second SCI is mapped may be the maximum value among values configured for single or multiple resource pools in the SL carrier. For example, the alpha offset value used when calculating the upper limit for the number of REs to which second SCI is mapped may be the average value of values configured for single or multiple resource pools in the SL carrier.

For example, a UE may assume that the gamma offset value is 0 or 5 or 6 or 11. For example, the length of a PSSCH symbol duration used when calculating the upper limit for the number of REs to which second SCI is mapped may be 12. For example, the length of a PSSCH symbol duration used when calculating the upper limit for the number of REs to which second SCI is mapped may be sl-LengthSymbols–2.

For example, the length of a PSSCH symbol duration used when calculating the upper limit for the number of REs to which second SCI is mapped may be configured differently according to a PSFCH resource period. For example, when the PSFCH resource period is 1, the length of the PSSCH symbol duration may be sl-LengthSymbols−5. For example, when the PSFCH resource period is 2, the length of the PSSCH symbol duration may be sl-LengthSymbols−2−1.5. For example, when the PSFCH resource period is 2, the length of the PSSCH symbol duration may be a value rounded up from sl-LengthSymbols−2−1.5. For example, when the PSFCH resource period is 2, the length of the PSSCH symbol duration may be a value rounded off from sl-LengthSymbols−2−1.5. For example, when the PSFCH resource period is 2, the length of the PSSCH symbol duration may be a value rounded down from sl-LengthSymbols−2−1.5. For example, when the PSFCH resource period is 4, the length of the PSSCH symbol duration may be sl-LengthSymbols−2−3/4. For example, when the PSFCH resource period is 4, the length of the PSSCH symbol duration may be a value rounded up from sl-LengthSymbols−2−3/4. For example, when the PSFCH resource period is 4, the length of the PSSCH symbol duration may be a value rounded off from sl-LengthSymbols−2−3/4. For example, when the PSFCH resource period is 4, the length of the PSSCH symbol duration may be a value rounded down from sl-LengthSymbols−2−3/4.

For example, the number of PRBs used when calculating the upper limit for the number of REs to which second SCI is mapped may be the total number of PRBs for the SL carrier. For example, the number of PRBs used when calculating the upper limit for the number of REs to which second SCI is mapped may be the total number of PRBs for a resource pool configured in the SL carrier. For example, the number of PRBs used when calculating the upper limit for the number of REs to which second SCI is mapped may be the minimum value among the numbers of PRBs constituting a resource pool configured in the SL carrier. For example, the number of PRBs used when calculating the upper limit for the number of REs to which second SCI is mapped may be the maximum value among the numbers of PRBs constituting a resource pool configured in the SL carrier. For example, the number of PRBs used when calculating the upper limit for the number of REs to which second SCI is mapped may be the average value of the numbers of PRBs constituting a resource pool configured in the SL carrier. For example, if the average value is not an integer, a UE may convert the average value into an integer by applying rounding down. For example, if the average value is not an integer, a UE may convert the average value into an integer by applying rounding up. For example, if the average value is not an integer, a UE may convert the average value into an integer by applying rounding off.

For example, the number of REs for second SCI used by a UE to calculate/determine the SL maximum data rate may be the number of REs derived from the minimum beta offset value (pre-)configured for a plurality of resource pools in an SL carrier. For example, the number of REs for second SCI used by a UE to calculate/determine the SL maximum data rate may be the number of REs derived from the minimum gamma offset value (pre-)configured for a plurality of resource pools in an SL carrier. For example, the number of REs for second SCI used by a UE to calculate/determine the SL maximum data rate may be the number of REs derived from the minimum second SCI payload amount (pre-)configured for a plurality of resource pools in an SL carrier. For example, the number of REs for second SCI used by a UE to calculate/determine the SL maximum data rate may be the number of REs derived from the minimum coding rate value (pre-)configured for a plurality of resource pools in an SL carrier. That is, a resource pool corresponding to each parameter may be different.

For example, the number of REs for second SCI used by a UE to calculate/determine the SL maximum data rate may be the minimum value among the minimum values for each resource pool of the number of REs for second SCI derived by combination of (pre-)set parameters for multiple resource pools within an SL carrier. For example, the number of REs for second SCI used by a UE to calculate/determine the SL maximum data rate may be the maximum value among the minimum values for each resource pool of the number of REs for second SCI derived by combination of (pre-)set parameters for multiple resource pools within an SL carrier. For example, the number of REs for second SCI used by a UE to calculate/determine the SL maximum data rate may be the average value of the minimum values for each resource pool of the number of REs for second SCI derived by combination of (pre-)set parameters for multiple resource pools within an SL carrier.

For example, the sum of the number of REs for a PSCCH used by a UE to calculate/determine the SL maximum data rate and/or the number of REs for second SCI and/or the number of REs for a PT-RS and/or the number of REs for a CSI-RS and/or the number of REs for a PSSCH DMRS may be the minimum value for values derived from (pre-)set parameter combination for a plurality of resource pools within an SL carrier. For example, the sum of the number of REs for a PSCCH used by a UE to calculate/determine the SL maximum data rate and/or the number of REs for second SCI and/or the number of REs for a PT-RS and/or the number of REs for a CSI-RS and/or the number of REs for a PSSCH DMRS may be the maximum value for values derived from (pre-)set parameter combination for a plurality of resource pools within an SL carrier. For example, the sum of the number of REs for a PSCCH used by a UE to calculate/determine the SL maximum data rate and/or the number of REs for second SCI and/or the number of REs for a PT-RS and/or the number of REs for a CSI-RS and/or the number of REs for a PSSCH DMRS may be the average value for values derived from (pre-)set parameter combination for a plurality of resource pools within an SL carrier. That is, in the above case, each overhead may be for the same resource pool, and may not be the minimum value compared to other resource pools in terms of each overhead.

In the present disclosure, when a UE determines overhead based on parameters for a plurality of resource pools, a UE can calculate/determine a maximum data rate related to transmission using parameters for a transmission resource pool, a UE may calculate/determine the maximum data rate related to reception using parameters for a reception resource pool. Alternatively, for example, when a UE determines overhead based on parameters for a plurality of resource pools, a UE may calculate/determine the maximum data rate using parameters for a reception resource pool. For example, when a UE determines the overhead based on parameters for a plurality of resource pools, the maximum data rate may be calculated/determined using parameters for both a transmission resource pool and a reception resource pool.

For example, a UE may obtain the maximum data rate for SL transmission and/or SL reception based on Equation 14.

$$\text{Data rate(in Mbps)} = 10^{-3} \cdot 2^n TBS \qquad \text{[Equation 14]}$$

Here, μ may be the subcarrier size for SL BWP. TBS may be a value calculated in the same way as the TBS calculation method for PSSCH transmission and reception based on overhead and/or parameters determined according to an embodiment of the present disclosure. For example, a scaling value may be additionally multiplied by Equation 14 above. For example, a UE may obtain the maximum data rate for SL transmission and/or SL reception based on Equation 15.

$$\text{Data rate(in Mbps)} = 10^{-3} \cdot 2^{\mu} \cdot TBS \cdot \text{theta} \qquad \text{[Equation 15]}$$

Here, theta may be a scaling value. For example, the scaling value may be predefined. For example, the scaling value may be configured or pre-configured for a UE for each transmission/reception. For example, the scaling value may be configured or pre-configured for a UE for each priority. For example, the scaling value may be configured or pre-configured for a UE for each service type. For example, the scaling value may be configured or pre-configured for a UE for each congestion level.

For example, a UE may obtain the maximum data rate for SL transmission and/or SL reception based on Equation 16.

$$\text{data rate (in } Mbps) = \qquad \text{[Equation 16]}$$

$$10^{-6} \cdot \sum_{j=1}^{J} \left( v_{layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right)$$

Here, Rmax may be 948/1024, J=1, v may be the number of layers, Ts may be the average length of OFDM symbols, Q may be modulation order, μ may be the subcarrier size for an SL BWP, f may be scaling value.

Figure 11:
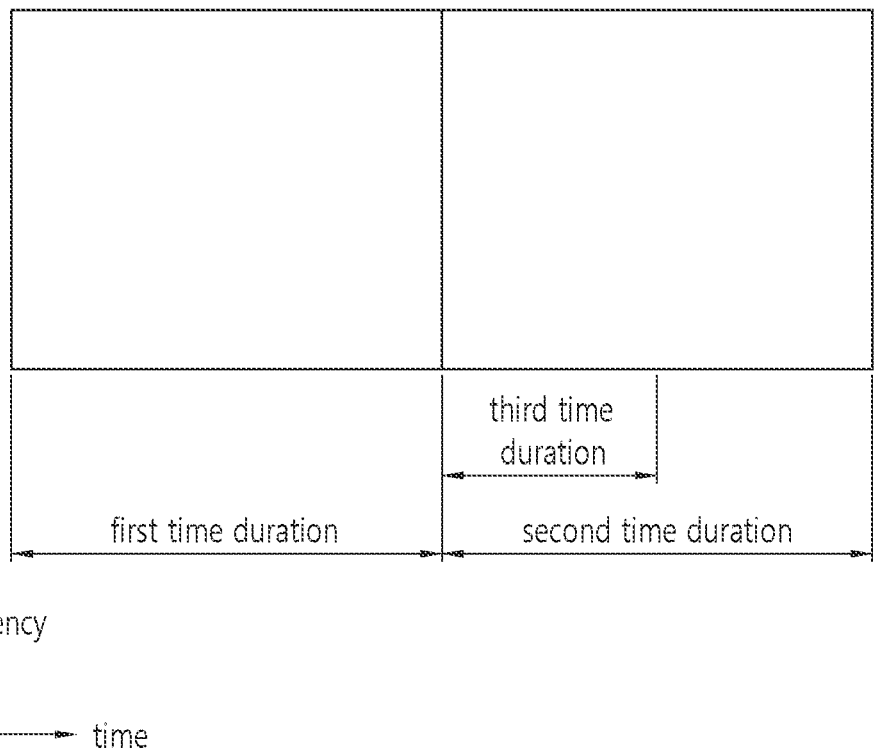
FIG. 11 is a diagram for explaining a method of determining a CBR value according to an embodiment of the present disclosure.

FIG. 11 is a diagram for explaining a method of determining a CBR value according to an embodiment of the present disclosure.

Meanwhile, in the next system, a UE performing SL communication may have limited reception capability or no reception capability. For example, in order to simplify the implementation of a UE and/or to achieve the purpose of saving power consumption of a UE, some UEs may have limited reception capability or no reception capability. For example, if the transmission opportunity is not limited to a UE with limited reception capability or no reception capability, in a resource pool used by the UE for transmission, available resources may be insufficient or a ratio of resources having a high interference level may become excessively high. According to various embodiments of the present disclosure, a method for performing congestion control by a UE having limited reception capability or no reception capability and a device supporting the same are proposed.

Meanwhile, a UE normally performing SL reception may measure SL RSSI for each sub-channel within a specific time duration (e.g., channel busy ratio (CBR) window), and the UE may derive a ratio value (hereinafter, a CBR value) of subchannels having the SL RSSI value equal to or greater than a (pre-)configured threshold value. For example, for a symbol duration for a PSCCH and/or a PSSCH (e.g., excluding the first symbol for AGC), a UE may obtain SL RSSI by measuring signal strength values for each subchannel. For example, according to the CBR value, some parameter values (e.g., MCS value range, the number of subchannels, maximum transmission power, the maximum number of retransmissions, etc.) to be used for transmission of a UE may be limited. In addition, according to the CBR value, a channel occupancy ratio (CR) limit value for each priority value may be (pre-)configured to a UE. For example, a UE may measure CR at a specific time point (e.g., slot n). Specifically, for example, a UE may derive a ratio of (ii) the number of subchannels actually occupied by the UE for SL transmission and/or the number of subchannels scheduled to be used in the future (reserved for use by SCI) compared to (i) the total number of subchannels that the UE can use for SL transmission within a CR window as a CR value, in a window (e.g., CR window) starting from the specific time point (e.g., slot n) to a specific time point in the past (e.g., slot n–a), to just before the time point of measuring the CR (e.g., slot n–1), or starting from the time at which CR is measured (e.g. slot n) to a point in the future (e.g. slot n+b). For example, a UE may obtain an SL transmission opportunity under a situation that satisfies the (cumulative) CR limit value for all priority values, and when a UE cannot satisfy a CR limit value for a specific priority value, a UE cannot continue SL transmission.

For example, SL RSSI may be defined as in Table 7.

TABLE 7

Sidelink received signal strength indicator (SL RSSI)

| | |
|---|---|
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the 2$^{nd}$ OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency, RRC_IDLE inter-frequency, RRC_CONNECTED intra-frequency, RRC_CONNECTED inter-frequency |

For example, SL CR may be defined as Table 8.

TABLE 8

Sidelink channel occupancy ratio (SL CR)

| | |
|---|---|
| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b]. |
| Applicable for | RRC_IDLE intra-frequency, RRC_IDLE inter-frequency, RRC_CONNECTED intra-frequency, RRC_CONNECTED inter-frequency |

NOTE 1:
a is a positive integer and b is 0 or a positive integer; a and b are determined by UE implementation with a + b + 1 = 1000 or 1000 · $2^\mu$ slots, according to higher layer parameter timeWindowSize-CR, b ≤ (a + b + 1)/2, and n + b shall not exceed the last transmission opportunity of the grant for the current transmission.
NOTE 2:
SL CR is evaluated for each (re)transmission.
NOTE 3:
In evaluating SL CR, the UE shall assume the transmission parameter used at slot n is reused according to the existing grant(s) in slot [n + 1, n + b] without packet dropping.
NOTE 4:
The slot index is based on physical slot index.
NOTE 5:
SL CR can be computed per priority level
NOTE 6:
A resource is considered granted if it is a member of a selected sidelink grant as defined in TS 38.321 V16.2.0.

For example, SL CBR may be defined as Table 9.

TABLE 9

Sidelink channel busy ratio (SL CBR)

| | |
|---|---|
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n − a, n − 1], wherein a is equal to 100 or 100 · $2^\mu$ slots, according to higher layer parameter timeWindowSize-CBR. |
| Applicable for | RRC_IDLE intra-frequency, RRC_IDLE inter-frequency, RRC_CONNECTED intra-frequency, RRC_CONNECTED inter-frequency |

NOTE 1:
The slot index is based on physical slot index.

For example, there may be a UE with a limited SL reception operation, the UE may be able to receive at least one of PSCCH reception, second SCI reception, and/or PSFCH reception in the entire time duration or a specific partial time duration (e.g., 'second time duration' shown in FIG. 11). For example, the specific partial time duration may be a time duration belonging to a sensing window of a UE (trying to detect first SCI and/or second SCI only for some slots). And/or, for example, the specific partial time duration may be a time duration that does not belong to an active time when a UE operates SL DRX. And/or, for example, the specific partial time duration may be a time duration that does not belong to an on-duration interval (e.g., 'first time duration' shown in FIG. 11). And/or, for example, the specific partial time duration may be a time duration that does not belong to a time duration in which sl-drxInactivityTimer (e.g., a timer restarted after a UE receives first SCI and/or second SCI (for new data)) is running. And/or, for example, the specific partial time duration may be a time duration that does not belong to a time duration in which sl-drxRetransmissionTimer (e.g., a time duration in which a UE expects SCI retransmission, a timer restarting after a predetermined time after a UE transmits a NACK, or a timer restarting after a predetermined time after a UE receives a PSSCH) is running. For example, the specific partial time duration may be a PSFCH slot corresponding to a PSCCH/PSSCH when a UE transmits the PSCCH/PSSCH (with SL HARQ-ACK feedback activated). For example, the specific partial time duration may be the PSFCH symbol period or PSFCH symbol position within a PSFCH slot corresponding to a PSCCH/PSSCH, when a UE transmits the PSCCH/PSSCH (with an SL HARQ-ACK feedback activated).

For example, when a UE performs only PSCCH detection tries in all or some slots within a CBR window, a UE may configure a ratio of the number of subchannels including a PSCCH resource whose SL RSSI value is equal to or greater than the (pre)set threshold to the total number of subchannels to be tried for PSCCH detection as a CBR value. For example, a UE may obtain a CBR value based on Equation 17.

$$CBR = \frac{\text{the number of subchannels including a PSCCH resource with an SL RSSI value greater than or equal to a (pre-)configured threshold}}{\text{the total number of subchannels to be tried for PSCCH detection}} \quad \text{[Equation 17]}$$

For example, a UE may determine/obtain the SL RSSI value for each of subchannel, for a symbol duration (e.g., excluding the first symbol for AGC) in which a PSCCH resource is configured, based on the received signal strength for all REs in a subchannel. For example, a UE may determine/obtain the SL RSSI value for each of subchannel, for a symbol duration (e.g., excluding the first symbol for AGC) in which a PSCCH resource is configured, based on the received signal strength for REs for a PSCCH.

For example, when a UE only try to detect a PSCCH in all or some slots within a CBR window, the UE may perform CBR measurement according to the following procedure. Specifically, for example, a UE may derive the total number of subchannels to be tried for PSCCH detection in a time duration in which only PSCCH detection is tried, and the UE may derive the total number of subchannels for PSCCH/PSSCH in a time duration other than the time duration in which only PSCCH detection is tried. And, a UE may derive the total sum of the number of subchannels. Next, a UE may configure a ratio of the number of subchannels including a PSCCH resource whose SL RSSI value is equal to or greater than the (pre)set threshold compared to the sum of the number of subchannels as a CBR value. For example, method and threshold for measuring the SL RSSI may be different for (i) a time duration in which only PSCCH detection is tried and (ii) a time duration other than the time duration in which only PSCCH detection is tried. For a PSFCH symbol duration (e.g., excluding the first symbol for AGC), the UE may obtain/derive a CBR value based on the RSSI. For example, a UE may measure RSSI for each RB for all RBs configured as PSFCH resources, and a UE may configure/define a ratio of the number of RBs with the RSSI value greater than or equal to a threshold (pre-)configured to a UE compared to the total number of RBs as a CBR value. For example, a UE may perform CBR measurement on a set of RBs configured with a PSFCH resource (hereinafter referred to as PSFCH resource set) according to the following procedure. Specifically, for example, according to the number of subchannels and/or slots for a PSSCH corresponding to a PSFCH resource set, the PSFCH resource set may be partitioned into a plurality of PSFCH RB groups. For example, the PSFCH resource set may be partitioned into a plurality of PSFCH RB groups based on Table 10. Here, for example, one PSFCH RB group may include one or more RBs. In this case, a UE may measure RSSI for each PSFCH RB group, and a UE may configure/define a ratio of the number of PSFCH RB groups with the RSSI value greater than or equal to a threshold (pre-)configured to a UE compared to the total number of the plurality of PSFCH RB groups as a CBR value.

TABLE 10

A UE is provided by sl-PSFCH-RB-Set-r16 a set of $M_{PRB,\,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch,\,slot}^{PSFCH}, (i + 1 + j \cdot N_{PSSCH}^{PSFCH}) \cdot M_{subch,\,slot}^{PSFCH} - 1]$ PRBs from the $M_{PRB,\,set}^{PSFCH}$ PRBs to slot i among the PSSCH slots associated with the PSFCH slot and sub-channel j, where $M_{subch,\,slot}^{PSFCH} = M_{PRB,\,set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,\,set}^{PSFCH}$ is a multiple of $N_{subch} \cdot N_{PSSCH}^{PSFCH}$.

example, in the time duration in which a UE only tries to detect a PSCCH (e.g., the 'second time duration' shown in FIG. 11), the UE may perform SL RSSI measurement limited to a PSCCH symbol duration (e.g., the 'third time duration' shown in FIG. 11). On the other hand, for example, in a time duration other than the time duration in which a UE only tries to detect a PSCCH, a UE may perform SL RSSI measurement for a PSCCH symbol duration and a PSSCH symbol duration. For example, the time duration other than the time duration in which only PSCCH detection is tried may include a time duration in which a UE tries PSCCH/PSSCH detection and/or a time duration in which a UE does not perform SL reception.

For example, when a UE performs only PSCCH detection tries in all or some slots within a CBR window, the UE may obtain/derive a CBR value for a time duration in which only PSCCH detection is tried and other time durations (e.g., a time duration in which PSCCH/PSSCH detection is tried and/or a time duration in which SL reception is not performed). For example, a UE may configure/define the maximum value among the two CBR values as a CBR value of the CBR window. For example, a UE may configure/define the minimum value among the two CBR values as a CBR value for the CBR window. For example, a UE may configure/define the average value of the two CBR values as a CBR value for the CBR window. For example, a UE may configure/define the weighted average value of the two CBR value according to the length of a time duration (or the number of configured subchannels) as a CBR value for the CBR window.

For example, when a UE performs only PSFCH detection tries in a specific time duration, a UE may measure RSSI in For example, when a UE measures an RSSI value for each of the PSFCH RB group, a UE may measure the signal strength of all PSFCH RBs or REs constituting a PSFCH RB group. According to the above method, in the case of group cast HARQ-ACK feedback option 2 (i.e., group cast option 2), since multiple PSFCH transmissions may occur for a single PSCCH/PSSCH, there is a possibility that the RSSI value may be overestimated. Accordingly, for example, when a UE measures an RSSI value for each of the PSFCH RB group, a UE may measure the signal strength of a specific RB among one or more PSFCH RBs constituting a PSFCH RB group. For example, a specific RB to be used for the RSSI measurement may be a PSFCH RB whose member ID value or M_ID value corresponds to 0. For example, when a UE measures an RSSI value for each of the PSFCH RB group, a UE may measure the signal strength for each of one or more PSFCH RBs constituting a PSFCH RB group, and the UE may configure/determine the maximum value among each of signal strength as an RSSI value. For example, when a UE measures an RSSI value for each of the PSFCH RB group, a UE may measure the signal strength for each of one or more PSFCH RBs constituting a PSFCH RB group, and the UE may configure/determine the minimum value among each of signal strength as an RSSI value. For example, when a UE measures an RSSI value for each of the PSFCH RB group, a UE may measure the signal strength for each of one or more PSFCH RBs constituting a PSFCH RB group, and the UE may configure/determine the average value of each of signal strength as an RSSI value.

On the other hand, in the case of groupcast HARQ-ACK feedback option 1 (i.e., groupcast option 1), since multiple UEs can transmit a PSFCH using the same RB and/or the same cyclic shift pair, the sum received power may be excessively large. Accordingly, for example, when a UE measures an RSSI value for each of the PSFCH RB group, the UE may measure signal strength for each PSFCH RB constituting an RB group. Here, a UE may configure/determine the maximum value among the each of specific values as an RSSI value, after converting each measured value into a specific value according to the maximum or minimum value (pre-)configured for each measured value. Or, a UE may configure/determine the minimum value among the each of specific values as an RSSI value, after converting each measured value into a specific value according to the maximum or minimum value (pre-)configured for each measured value. Or, a UE may configure/determine the average value of the each of specific values as an RSSI value, after converting each measured value into a specific value according to the maximum or minimum value (pre-)configured for each measured value.

The embodiments of the present disclosure may be performed independently of each other or may be simultaneously applied in a complementary manner. For example, a UE may perform PSCCH detection and PSFCH detection in a specific time duration, and may use CBR measurement schemes corresponding to each reception by convergence. For example, for an RSSI measurement and a CBR measurement performed independently, a UE may set/determine the maximum value as the final CBR value. For example, for an RSSI measurement and a CBR measurement performed independently, a UE may set/determine the minimum value as the final CBR value. For example, for an RSSI measurement and a CBR measurement performed independently, a UE may set/determine the average value as the final CBR value. For example, a transmission parameter limit configuration value based on SL RSSI-based CBR measurement value for PSCCH/PSSCH symbol duration and a transmission parameter limit configuration value by CBR measurement value based on SL RSSI for PSCCH or PSFCH may be independently (pre-)configured for a UE.

For example, there may be a UE with a limited SL reception operation, and the UE may not perform an SL reception operation in the entire time duration. For example, a plurality of time durations may be (pre-)configured for a UE, different reference CBR values for each of the time duration may be (pre-)configured for a UE. For example, a UE may receive information related to a plurality of time durations from network, the UE may receive different reference CBR values for each of the time duration from network. For example, SL DRX-related information may be provided or (pre-)configured for a UE, a reference CBR value for the time duration during which sl-drxOnDuration-Timer is running or corresponding to it and reference CBR values for other regions may be (pre-)configured for a UE. For example, a UE may receive SL DRX-related information from network, a UE may receive information related to a reference CBR value for the time duration during which sl-drxOnDurationTimer is running or corresponding to it and information related to reference CBR values for other regions from network. According to the above method, a UE can expect/determine that the CBR value will be relatively high as a plurality of UEs try SL transmission during the an on-duration time duration, a UE may expect/determine that the CBR value will be relatively low in other time durations.

For example, a reference CBR value may be different according to CBR measurement time point of a UE. For example, based on CBR measurement time point of a UE, a CBR window may be configured, a single or a plurality of reference CBR values may be configured for time resources within a CBR window, a UE may set/determine the maximum value or the minimum value or the average value or the weighted average value reflecting the length of the time duration among them as the final CBR value. For example, the CBR window may be a set of slots from the slot just before the CBR measurement time point to the previous slots as many as the number of (pre-)configured slots. For example, slots constituting the CBR window may be physical slots regardless of whether the slot belongs to a resource pool or not. That is, slots not belonging to a resource pool as well as slots belonging to a resource pool may be included in a CBR window. Alternatively, for example, slots constituting the CBR window may be logical slots bound to slots belonging to a resource pool. That is, only slots belonging to a resource pool may be included in a CBR window. For example, slots constituting the CBR window may be slots that may belong to a resource pool (e.g., slots in which the symbol duration from the SL start symbol to the end symbol is a cell-specific UL symbol, and/or slots that are not S-SSB slots and/or slots that are not reserved slots). For example, slots constituting the CBR window may be slots in which the symbol duration from the SL start symbol to the end symbol is a cell-specific UL symbol. For example, for an SL slot for which SL RSSI measurement is not valid, a UE may always calculate/obtain a CBR value assuming that the SL RSSI value is equal to or greater than a (pre-)configured threshold value. For example, for an SL slot for which SL RSSI measurement is not valid, a UE may always calculate/obtain a CBR value assuming that the SL RSSI value is less than or equal to a (pre-)configured threshold.

The embodiments of the present disclosure may be performed independently of each other or may be simultaneously applied in a complementary manner. For example, a UE may try to receive a PSCCH/PSSCH/PSFCH in a first time duration, a UE may try reception of some of a PSCCH and/or a PSSCH and/or a PSFCH in a second time duration, and a UE may not perform an SL reception operation in a third time duration. For example, a UE may perform CBR measurement only for the first time duration and/or the second time duration during which SL reception is performed in a CBR window, and the UE may set/determine a CBR representative value (e.g., the minimum value, the maximum value, the average value) among the measured CBR value as the final CBR value. In the above-described embodiment, the number of slots for which a UE actually measures the CBR may be smaller than the size of a CBR window. For example, a UE may reconfigure a CBR window only with slots performing SL reception (e.g., a first time duration and/or a second time duration), a CBR window may consist of slots in a non-contiguous resource pool. For example, a UE may measure CBR within the reset a CBR window. For example, a UE may perform CBR measurement for the first time duration and/or the second time duration during which SL reception is performed in a CBR window. For example, for other slots (e.g., slots corresponding to the third time duration), a UE may set/determine the minimum value among the CBR measurement value (i.e., the CBR measurement value for the first time duration and/or the second time duration) and a reference CBR value as the final CBR value, using a reference CBR value configured for the time durations. For example, for other slots (e.g., slots corresponding to the third time duration), a UE may set/determine the maximum value among the CBR measurement value (i.e., the CBR measurement value for the first time duration and/or the second time duration) and a reference CBR value as the final CBR value, using a reference CBR value configured for the time durations. For example, for other slots (e.g., slots corresponding to the third time duration), a UE may set/determine the average value of the CBR measurement value (i.e., the CBR measurement value for the first time duration and/or the second time duration) and a reference CBR value as the final CBR value, using a reference CBR value configured for the time durations.

For example, a UE may determine its transmission opportunity based on the CR measurement value, and the CR limit threshold for determining the transmission opportunity may be applied differently according to resource selection method (e.g., random selection or sensing-based resource selection). For example, a UE may not include resources occupied or reserved by random selection in CR measurement. That is, a UE may not consider resources occupied or reserved by random selection in CR measurement. Specifically, for example, when calculating the ratio of subchannels occupied by a UE in the past and/or reserved in the future for transmission of the UE within a CR window, a subchannel occupied and/or reserved by a random selection may not affect a CR measurement value. In other words, a UE may obtain/calculate a CR measurement value based on the number of subchannels selected through a resource (re) selection procedure based on full and/or partial sensing. For example, for each resource selection method, a UE may differently compare the CR measurement value and the CR limit threshold. For example, for each resource selection method, based on the CR measurement and CR limit threshold, a specific resource selection method may be allowed for a UE, and a specific resource selection method may not be allowed for a UE. For example, for all resource selection methods, a UE may obtain a transmission opportunity only when the CR measurement value satisfies the CR limit threshold.

For example, a UE may determine its own transmission opportunity based on the transmission data rate during a specific time duration. For example, a UE may calculate the transmission data rate using (i) the sum of the amount of data or TBS transmitted from the time point right before (n−1) from the specific time point n (e.g., the time point at which transmission is to be performed) to the point in the past (n−a) and/or (ii) the sum of the amount of data or TBS scheduled to be transmitted from the specific time point (n) to a specific future time point (n+b) and (iii) a specific time window size (a+b+1) or a time conversion value for it. For example, n, a, b may be zero or positive integers. For example, n, a, b may be in unit of slots. For example, only when the TBs are different from each other, the different TBs may be included in the TBS sum. For example, even when the same TB exists through retransmission or the like, the same TB may be repeatedly included in the TBS sum. For example, a UE may obtain a transmission opportunity when the transmission data rate does not exceed a specific data rate limit value, and the UE may not obtain a transmission opportunity in other cases. For example, the past time point (a) and/or the future time point (b) may be configured or pre-configured for a UE for each priority value. For example, the past time point (a) and/or the future time point (b) may be configured or pre-configured for a UE for each SL BWP. For example, the past time point (a) and/or the future time point (b) may be configured or pre-configured for a UE for each resource pool. For example, the past time point (a) and/or the future time point (b) may be configured or pre-configured for a UE for each range of level/values of congestion control. For example, a UE may determine the past time point (a) and/or the future time point (b) by itself (depending on the implementation). For example, the size of a window for calculating a data rate to determine a transmission opportunity may be configured or pre-configured for a UE for each priority value. For example, the size of a window for calculating a data rate to determine a transmission opportunity may be configured or pre-configured for a UE for each SL BWP. For example, the size of a window for calculating a data rate to determine a transmission opportunity may be configured or pre-configured for a UE for each resource pool. For example, the size of a window for calculating a data rate to determine a transmission opportunity may be configured or pre-configured for a UE for each range of level/values of congestion control. For example, the value of the b may be less than or equal to half of the size of the window, and the value of the b may be set to a zero value. For example, the size of the window or the location of a or the location of b may be determined in the physical slot domain. For example, the size of the window or the location of a or the location of b may be determined in the slot domain in a resource pool. For example, the size of the window or the location of a or the location of b may be determined in the slot set domain (e.g., a slot in which the symbol duration as many as the number of SL symbols is cell-specific UL from the SL start symbol or a slot subject to bitmap application in resource pool configuration) in which SL can be used. For example, the data rate limit value may be configured or pre-configured for a UE for each priority value. For example, the data rate limit value may be configured or pre-configured for a UE for each SL BWP. For example, the data rate limit value may be configured or pre-configured for a UE for each resource pool. For example, the data rate limit value may be configured or pre-configured for a UE for each range of level/values of congestion control. For example, a data rate limit value may be obtained/calculated in a form of Equation 16, the number of reference layers and/or modulation order information and/or a scaling value and/or overhead value for this may be (pre-)configured for a UE.

In the present disclosure, although it is assumed that a plurality of transmission resource pools and/or reception resource pools in an SL carrier are FDMed for all or some slots, the technical idea is not limited thereto. Even when a single resource pool is supported within an SL carrier or when FDM between resource pools is not supported, the technical idea of the present disclosure may be extended and applied.

Figure 12:
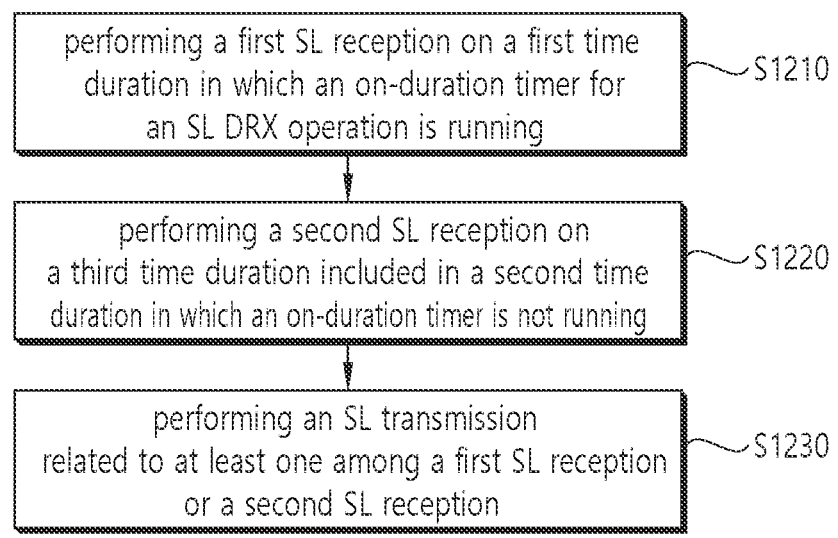
FIG. 12 is a flowchart showing a method in which a first device performs sidelink communication according to an embodiment of the present disclosure.

FIG. 12 is a flowchart showing a method in which a first device performs sidelink communication according to an embodiment of the present disclosure.

Operations disclosed in the flowchart of FIG. 12 may be performed in combination with various embodiments of the present disclosure. In one example, the operations disclosed in the flowchart of FIG. 12 may be performed based on at least one of the devices shown in FIGS. 13 to 18. In one example, the first device of FIG. 12 may correspond to the first wireless device 100 of FIG. 14 described below, and the second device may correspond to the second wireless device 200 of FIG. 14. In another example, the first device of FIG. 12 may correspond to the second wireless device 200 of FIG. 14 described below, and the second device may correspond to the first wireless device 100.

In step S1210, a first device according to an embodiment may perform a first sidelink (SL) reception on a first time duration in which an on-duration timer for an SL discontinuous reception (DRX) operation is running.

In step S1220, a first device according to an embodiment may perform a second SL reception on a third time duration included in a second time duration in which the on-duration timer is not running.

In step S1220, a first device according to an embodiment may perform an SL transmission related to at least one among the first SL reception or the second SL reception.

In an embodiment, the first SL reception performed on the first time duration in a channel busy ratio (CBR) window may include a physical sidelink control channel (PSCCH) reception and a physical sidelink shared channel (PSSCH) reception.

In an embodiment, the second SL reception performed on the third time duration in the CBR window may include the PSCCH reception and does not include the PSSCH reception, In an embodiment, a first CBR value related to the second time duration may be determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

In an embodiment, the first time duration may be a duration belonging to an active time when a UE (a first device) operates SL DRX.

In an embodiment, the second time duration may be a time duration in which a UE (a first device) tries only PSCCH detection.

In an embodiment, the third time duration may be a PSCCH symbol duration.

In an embodiment, a second CBR value related to the first time duration may be determined as ratio of subchannels with an SL RSSI value greater than or equal to a second threshold among total subchannels to be tried for PSCCH or PSSCH detection.

In an embodiment, a CBR value for the CBR window may be determined as a maximum value among the first CBR value and the second CBR value.

In an embodiment, a CBR value for the CBR window may be determined as a minimum value among the first CBR value and the second CBR value.

In an embodiment, a CBR value for the CBR window may be determined as an average value of the first CBR value and the second CBR value.

In an embodiment, a CBR value for the CBR window may be determined as a weighted average value of the first CBR value and the second CBR value, according to lengths of the first time duration and the second time duration.

In an embodiment, the first threshold value and the second threshold value mat be the same.

In an embodiment, at least one of the first threshold value or the second threshold value may be configured by a base station.

In an embodiment, the first SL reception performed within the CBR window may include at least one of the PSCCH reception, the PSSCH reception or a physical sidelink feedback channel (PSFCH) reception.

In an embodiment, the second SL reception performed within the CBR window may include the PSCCH reception, and may not include the PSSCH reception and the PSFCH reception.

In an embodiment, the first CBR value related to the second time duration may be determined as ratio of subchannels with the SL RSSI value greater than or equal to the first threshold value and including a PSCCH resource among the total subchannels to be tried for the PSCCH detection, based on the second SL reception performed within the CBR window including the PSCCH reception and not including the PSSCH reception and the PSFCH reception.

In an embodiment, performing the SL transmission related to at least one among the first SL reception or the second SL reception may further include: transmitting sidelink hybrid automatic repeat request (HARQ) feedback information related to at least one of the first SL reception or the second SL reception, through a PSFCH.

According to an embodiment of the present disclosure, a first device for performing sidelink communication may be proposed. For example, the first device may comprise: at least one memory storing instructions; at least one transceiver; and at least one processor connected to the at least one memory and the at least one transceiver, wherein the at least one processor execute the instructions to: perform a first sidelink (SL) reception on a first time duration in which an on-duration timer for an SL discontinuous reception (DRX) operation is running; perform a second SL reception on a third time duration included in a second time duration in which the on-duration timer is not running; and perform an SL transmission related to at least one among the first SL reception or the second SL reception, wherein the first SL reception performed on the first time duration in a channel busy ratio (CBR) window may include a physical sidelink control channel (PSCCH) reception and a physical sidelink shared channel (PSSCH) reception, wherein the second SL reception performed on the third time duration in the CBR window may include the PSCCH reception and does not include the PSSCH reception, wherein a first CBR value related to the second time duration may be determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

According to an embodiment of the present disclosure, a device (or a chip(set)) adapted to control a first user equipment (UE). The device may comprise: one or more processors; and one or more memories operably connectable to the one or more processors and storing instructions, wherein the one or more processors execute the instructions to: perform a first sidelink (SL) reception on a first time duration in which an on-duration timer for an SL discontinuous reception (DRX) operation is running; perform a second SL reception on a third time duration included in a second time duration in which the on-duration timer is not running; and perform an SL transmission related to at least one among the first SL reception or the second SL reception, wherein the first SL reception performed on the first time duration in a channel busy ratio (CBR) window may include a physical sidelink control channel (PSCCH) reception and a physical sidelink shared channel (PSSCH) reception, wherein the second SL reception performed on the third time duration in the CBR window may include the PSCCH reception and does not include the PSSCH reception, wherein a first CBR value related to the second time duration may be determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

In one example, the first UE in the above embodiment may represent the first device described throughout the present disclosure. In one example, the at least one processor, the at least one memory, etc. in the device for controlling the first UE may be implemented as separate sub chips, alternatively, at least two or more components may be implemented through one sub-chip.

According to an embodiment of the present disclosure, a non-transitory computer-readable storage medium storing instructions may be proposed. The instructions, when executed, may cause a first device to: perform a first sidelink (SL) reception on a first time duration in which an on-duration timer for an SL discontinuous reception (DRX) operation is running; perform a second SL reception on a third time duration included in a second time duration in which the on-duration timer is not running; and perform an SL transmission related to at least one among the first SL reception or the second SL reception, wherein the first SL reception performed on the first time duration in a channel busy ratio (CBR) window may include a physical sidelink control channel (PSCCH) reception and a physical sidelink shared channel (PSSCH) reception, wherein the second SL reception performed on the third time duration in the CBR window may include the PSCCH reception and does not include the PSSCH reception, wherein a first CBR value related to the second time duration may be determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

In one example, according to the prior art, when a UE can detect only a PSCCH, when a UE can detect only a PSFCH, or when a UE does not have SL RX capability, a problem in which the UE cannot perform CBR/CR measurement may occur. According to an embodiment of the present disclosure, in the case of a UE performing only a PSCCH reception operation, RSSI measurement may be limited to PSCCH symbols and/or RBs. According to another embodiment of the present disclosure, in the case of a UE performing only a PSFCH reception operation, the CBR may be calculated by measuring the RSSI for the PSFCH RB. According to another embodiment of the present disclosure, when the SL operating methods within the CBR window are different, the final CBR may be calculated by calculating the CBR for each operating method and then combining them. According to some embodiments of the present disclosure, a congestion control operation may be performed even in the case of a UE having a limited SL reception operation.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
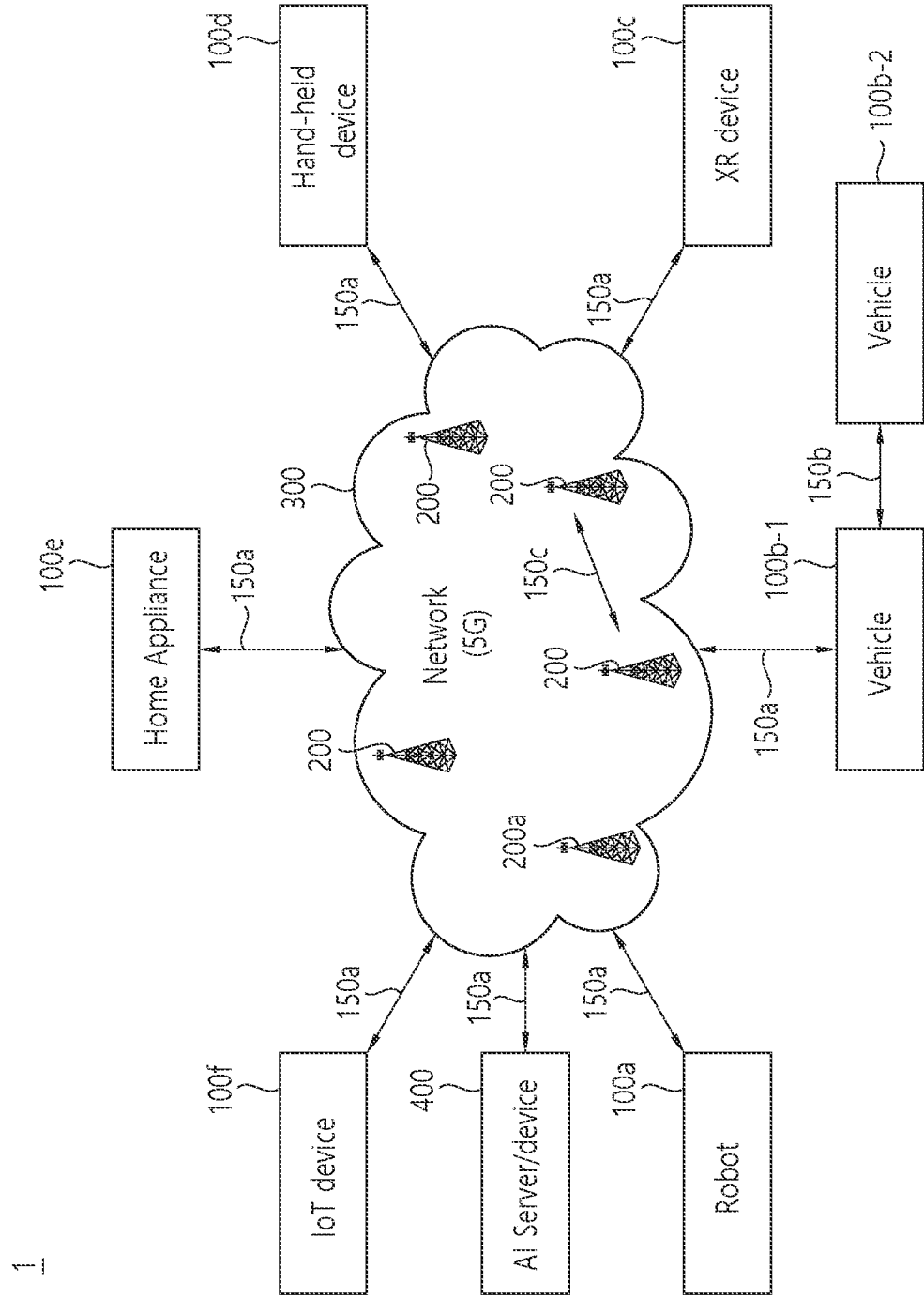
FIG. 13 shows a communication system 1, in accordance with an embodiment of the present disclosure.

FIG. 13 shows a communication system 1, in accordance with an embodiment of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
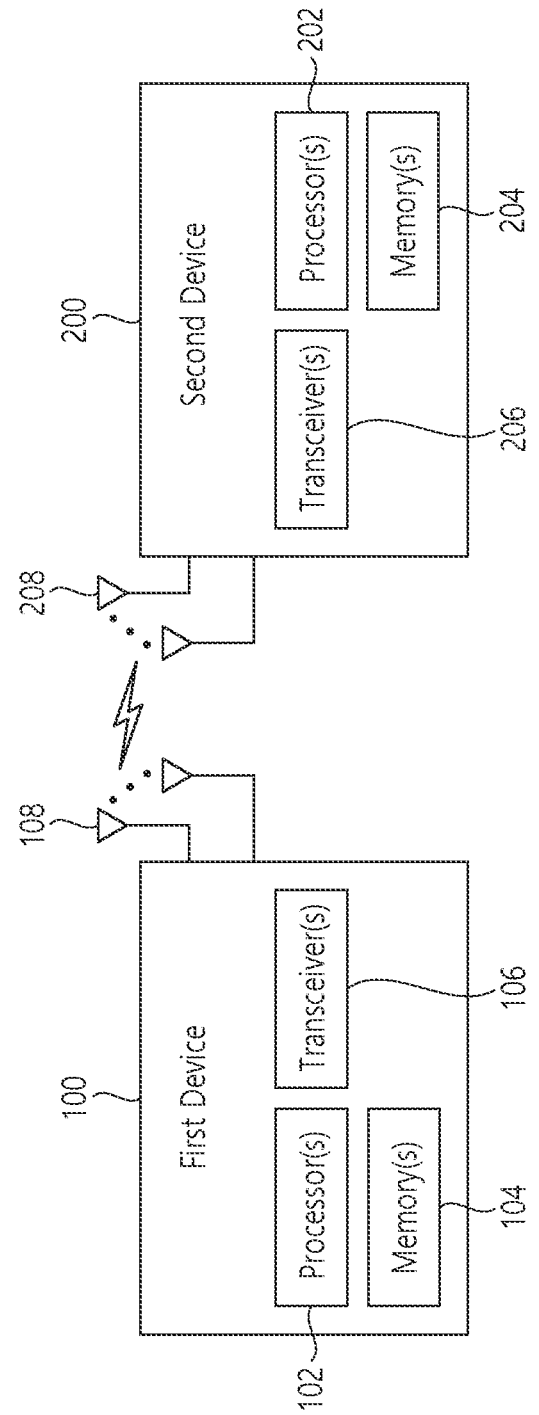
FIG. 14 shows wireless devices, in accordance with an embodiment of the present disclosure.

FIG. 14 shows wireless devices, in accordance with an embodiment of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
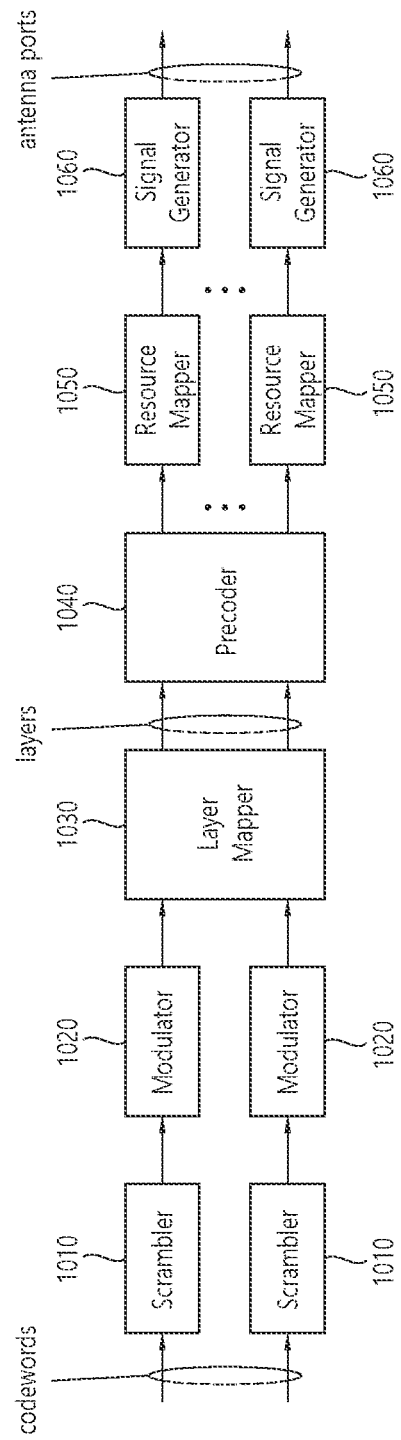
FIG. 15 shows a signal process circuit for a transmission signal, in accordance with an embodiment of the present disclosure.

FIG. 15 shows a signal process circuit for a transmission signal, in accordance with an embodiment of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device.

The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
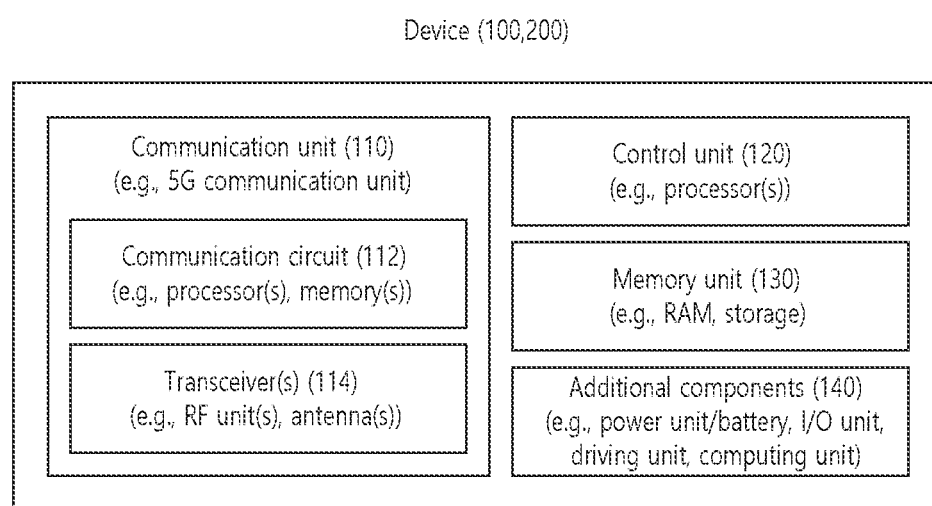
FIG. 16 shows another example of a wireless device, in accordance with an embodiment of the present disclosure.

FIG. 16 shows another example of a wireless device, in accordance with an embodiment of the present disclosure. The wireless device may be implemented in various forms according to a use-case/service (refer to FIG. 13).

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
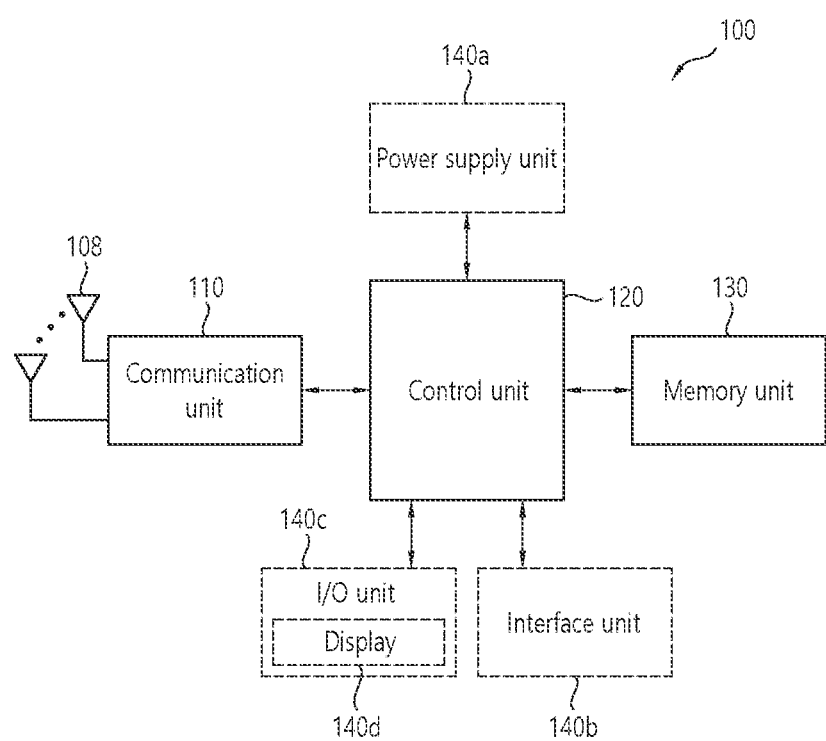
FIG. 17 shows a hand-held device, in accordance with an embodiment of the present disclosure.

FIG. 17 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
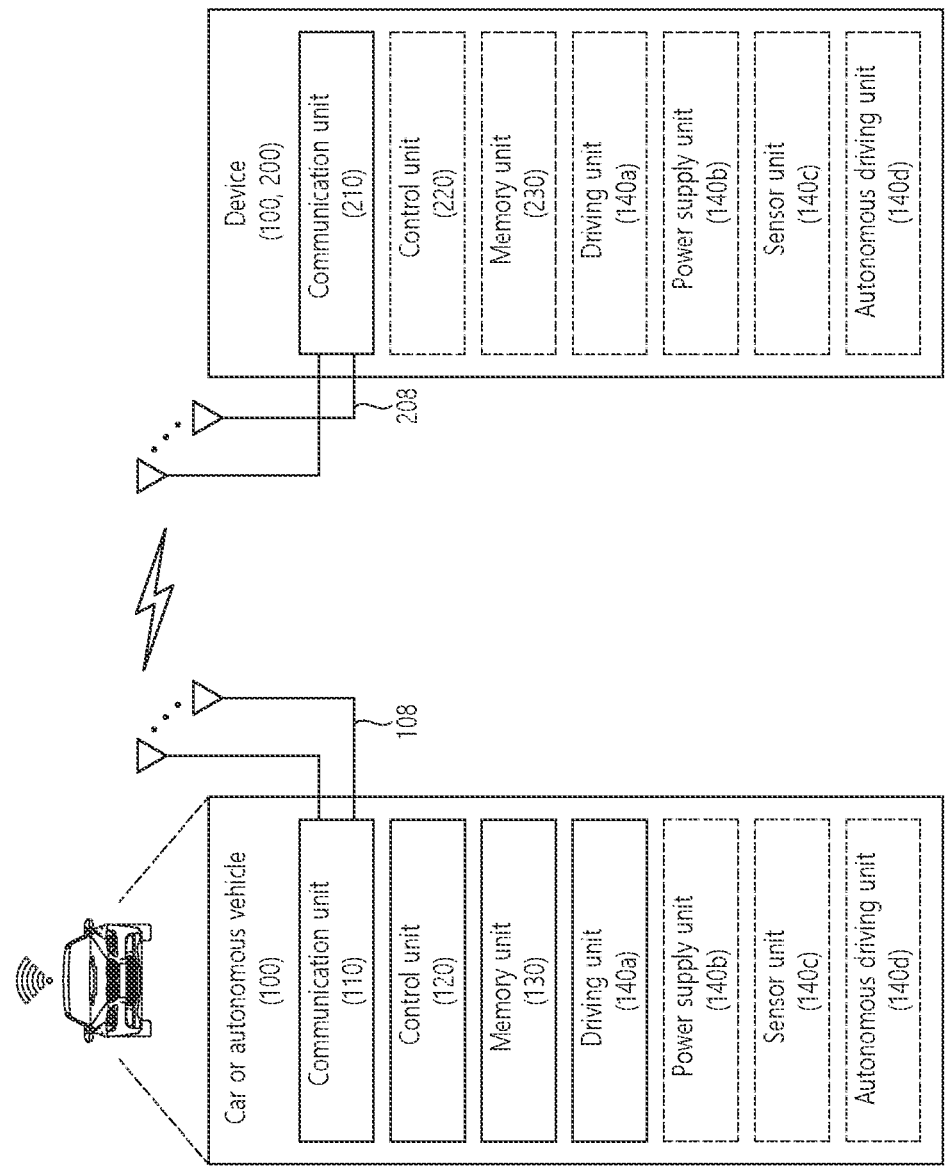
FIG. 18 shows a vehicle or an autonomous vehicle, in accordance with an embodiment of the present disclosure.

FIG. 18 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 18, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in a device, and technical features in device claims can be combined to be implemented or performed in a method. Further, technical features in method claim(s) and device claim(s) can be combined to be implemented or performed in a device. Further, technical features in method claim(s) and device claim(s) can be combined to be implemented or performed in a method.

What is claimed is:

1. A method for performing, by a first device, sidelink communication, the method comprising:
    performing a first sidelink (SL) reception on a first time duration in which an on-duration timer for an SL discontinuous reception (DRX) operation is running;
    performing a second SL reception on a third time duration included in a second time duration in which the on-duration timer is not running; and
    performing an SL transmission related to at least one among the first SL reception or the second SL reception,
    wherein the first SL reception performed on the first time duration in a channel busy ratio (CBR) window includes a physical sidelink control channel (PSCCH) reception and a physical sidelink shared channel (PSSCH) reception,
    wherein the second SL reception performed on the third time duration in the CBR window includes the PSCCH reception and does not include the PSSCH reception,
    wherein a first CBR value related to the second time duration is determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

2. A method of claim 1, wherein a second CBR value related to the first time duration is determined as ratio of subchannels with an SL RSSI value greater than or equal to a second threshold among total subchannels to be tried for PSCCH or PSSCH detection.

3. A method of claim 2, wherein a CBR value for the CBR window is determined as a maximum value among the first CBR value and the second CBR value.

4. A method of claim 2, wherein a CBR value for the CBR window is determined as a minimum value among the first CBR value and the second CBR value.

5. A method of claim 2, wherein a CBR value for the CBR window is determined as an average value of the first CBR value and the second CBR value.

6. A method of claim 2, wherein a CBR value for the CBR window is determined as a weighted average value of the first CBR value and the second CBR value, according to lengths of the first time duration and the second time duration.

7. A method of claim 2, wherein the first threshold value and the second threshold value are the same.

8. A method of claim 2, wherein at least one of the first threshold value or the second threshold value is configured by a base station.

9. A method of claim 1, wherein the first SL reception performed within the CBR window includes at least one of the PSCCH reception, the PSSCH reception or a physical sidelink feedback channel (PSFCH) reception,
wherein the second SL reception performed within the CBR window includes the PSCCH reception, and does not include the PSSCH reception and the PSFCH reception, and
wherein the first CBR value related to the second time duration is determined as ratio of subchannels with the SL RSSI value greater than or equal to the first threshold value and including a PSCCH resource among the total subchannels to be tried for the PSCCH detection, based on the second SL reception performed within the CBR window including the PSCCH reception and not including the PSSCH reception and the PSFCH reception.

10. A method of claim 1, wherein performing the SL transmission related to at least one among the first SL reception or the second SL reception further includes:
transmitting sidelink hybrid automatic repeat request (HARQ) feedback information related to at least one of the first SL reception or the second SL reception, through a PSFCH.

11. A first device for performing sidelink communication, the first device comprising:
at least one memory storing instructions;
at least one transceiver; and
at least one processor connected to the at least one memory and the at least one transceiver, wherein the at least one processor execute the instructions to:
perform a first sidelink (SL) reception on a first time duration in which an on-duration timer for an SL discontinuous reception (DRX) operation is running;
perform a second SL reception on a third time duration included in a second time duration in which the on-duration timer is not running; and
perform an SL transmission related to at least one among the first SL reception or the second SL reception,
wherein the first SL reception performed on the first time duration in a channel busy ratio (CBR) window includes a physical sidelink control channel (PSCCH) reception and a physical sidelink shared channel (PSSCH) reception,
wherein the second SL reception performed on the third time duration in the CBR window includes the PSCCH reception and does not include the PSSCH reception,
wherein a first CBR value related to the second time duration is determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

12. A device adapted to control a first user equipment (UE), the device comprising:
one or more processors; and
one or more memories operably connectable to the one or more processors and storing instructions, wherein the one or more processors execute the instructions to:
perform a first sidelink (SL) reception on a first time duration in which an on-duration timer for an SL discontinuous reception (DRX) operation is running;
perform a second SL reception on a third time duration included in a second time duration in which the on-duration timer is not running; and
perform an SL transmission related to at least one among the first SL reception or the second SL reception,
wherein the first SL reception performed on the first time duration in a channel busy ratio (CBR) window includes a physical sidelink control channel (PSCCH) reception and a physical sidelink shared channel (PSSCH) reception,
wherein the second SL reception performed on the third time duration in the CBR window includes the PSCCH reception and does not include the PSSCH reception,
wherein a first CBR value related to the second time duration is determined as ratio of subchannels with an SL received signal strength indicator (RSSI) value greater than or equal to a configured first threshold value and including a PSCCH resource among total subchannels to be tried for PSCCH detection, based on the second SL reception performed on the third time duration including the PSCCH reception and not including the PSSCH reception.

* * * * *